(12) United States Patent
Li et al.

(10) Patent No.: US 10,032,030 B2
(45) Date of Patent: Jul. 24, 2018

(54) TRUSTED KERNEL STARTING METHOD AND APPARATUS

(71) Applicants: Huawei Technologies Co., Ltd., Shenzhen (CN); Wuhan University, Wuhan (CN)

(72) Inventors: Zhi Li, Beijing (CN); Bo Zhao, Wuhan (CN); Yongkang Fei, Wuhan (CN)

(73) Assignees: Huawei Technologies Co., Ltd., Shenzhen (CN); Wuhan University, Wuhan (CN)

( * ) Notice: Subject to any disclaimer, the term of this patent is extended or adjusted under 35 U.S.C. 154(b) by 100 days.

(21) Appl. No.: 15/272,199

(22) Filed: Sep. 21, 2016

(65) Prior Publication Data

US 2017/0011219 A1 Jan. 12, 2017

Related U.S. Application Data

(63) Continuation of application No. PCT/CN2015/074003, filed on Mar. 11, 2015.

(30) Foreign Application Priority Data

Mar. 25, 2014 (CN) .......................... 2014 1 0114837

(51) Int. Cl.
*G06F 21/57* (2013.01)
*G06F 9/44* (2018.01)
*H04L 9/08* (2006.01)
*H04L 9/32* (2006.01)
*G06F 9/4401* (2018.01)

(52) U.S. Cl.
CPC .......... *G06F 21/575* (2013.01); *G06F 9/4401* (2013.01); *H04L 9/0838* (2013.01); *H04L 9/3234* (2013.01)

(58) Field of Classification Search
CPC ... G06F 21/575; G06F 9/4401; H04L 9/0838; H04L 9/3234
See application file for complete search history.

(56) References Cited

U.S. PATENT DOCUMENTS

8,775,784 B2 * 7/2014 Diluoffo ............... G06F 21/575
713/1
8,850,212 B2 * 9/2014 Proudler ................. G06F 21/57
713/151

(Continued)

FOREIGN PATENT DOCUMENTS

CN 1625105 A 6/2005
CN 101122936 A 2/2008

(Continued)

OTHER PUBLICATIONS

Shen et al., "Study of Trusted Computing and development," Science China Press, vol. 40, No. 2., pp. 139-166, (2010).

(Continued)

*Primary Examiner* — Stefan Stoynov
(74) *Attorney, Agent, or Firm* — Leydig, Voit & Mayer, Ltd.

(57) ABSTRACT

A trusted kernel starting method and apparatus are provided. The method includes: starting a security boot module boot loader; invoking the boot loader to measure, according to a first security algorithm, whether a platform configuration register (PCR) partition is trusted; if the PCR partition is trusted, invoking the boot loader to read kernel code into a memory, and invoking the boot loader to measure, according to a first complete algorithm and a kernel code standard measurement value prestored in the PCR partition, whether the kernel code is trusted; initializing, if the kernel code is trusted, the kernel code to trigger an initialized kernel to measure, according to a second complete algorithm, whether the boot loader is trusted; and starting the kernel if the boot loader is trusted. Kernel starting security is improved.

24 Claims, 14 Drawing Sheets

(56) References Cited

U.S. PATENT DOCUMENTS

| | | | |
|---|---|---|---|
| 9,465,943 B2* | 10/2016 | Paris | G06F 17/30 |
| 2003/0074548 A1 | 4/2003 | Cromer et al. | |
| 2005/0251857 A1 | 11/2005 | Schunter et al. | |
| 2006/0015717 A1 | 1/2006 | Liu et al. | |
| 2006/0155988 A1 | 7/2006 | Hunter et al. | |
| 2008/0270781 A1 | 10/2008 | Ibrahim et al. | |
| 2009/0070598 A1 | 3/2009 | Cromer et al. | |
| 2012/0185683 A1 | 7/2012 | Krstic et al. | |
| 2012/0185694 A1 | 7/2012 | Munetoh et al. | |
| 2013/0218915 A1 | 8/2013 | Billau et al. | |
| 2014/0025939 A1 | 1/2014 | Smith et al. | |
| 2014/0068276 A1 | 3/2014 | Imamoto et al. | |

FOREIGN PATENT DOCUMENTS

| | | |
|---|---|---|
| CN | 101295339 A | 10/2008 |
| CN | 101504704 A | 8/2009 |
| CN | 102136044 A | 7/2011 |
| CN | 103020518 A | 4/2013 |
| CN | 103020531 A | 4/2013 |
| CN | 103150523 A | 6/2013 |
| JP | 2006323814 A | 11/2006 |
| JP | 2014048725 A | 3/2014 |
| JP | 2014505943 A | 3/2014 |
| KR | 20060081334 A | 7/2006 |
| KR | 20070020520 A | 2/2007 |
| KR | 1008721750000 B1 | 12/2008 |
| KR | 20130094317 A | 8/2013 |

OTHER PUBLICATIONS

"BitLocker Drive Encryption: Technical Overview," XP-002426529, Microsoft Corporation (Apr. 4, 2006).

Russinovich, "Inside the Windows Vista Kernel," Microsoft TechNet, Microsoft Corporation (Downloaded Jan. 20, 2017), Oct. 21, 2008.

"BitLocker Drive Encryption in Windows Vista," XP55337593, pp. 1-9 (Aug. 6, 2010).

* cited by examiner

TRUSTED KERNEL STARTING METHOD AND APPARATUS

CROSS-REFERENCE TO RELATED APPLICATIONS

This application is a continuation of International Application No. PCT/CN2015/074003, filed on Mar. 11, 2015, which claims priority to Chinese Patent Application No. 201410114837.9, filed on Mar. 25, 2014, both of which are hereby incorporated by reference in their entireties.

TECHNICAL FIELD

Embodiments of the present invention relate to the field of trusted computing technologies, and in particular, to a trusted kernel starting method and apparatus.

BACKGROUND

In recent years, with the popularization of a third generation mobile communications (3G) network, smartphones have become the fastest-growing information industry (Information Technology, IT) products.

Fast-growing smart mobile devices bring the information era into a new development climax. However, excessive demands are made on improvement of application performance of the smart mobile devices, and development of security performance is ignored, resulting in that development of security performance of the mobile devices lags behind, and a potential security problem of mobile phones is gradually exposed. For secure starting of smart mobile devices, in the prior art, a method of performing starting from an external security unit, that is, the external security unit is connected to an embedded device by using a communications interface, to provide a security function for the embedded device. When a device is started, the embedded device first needs to determine existence of the external security unit, to prevent unauthorized starting from bypassing an external root of trust of a chain of trust, a system boot program is then loaded, the boot program invokes the security unit to perform integrity measurement on a kernel of an operating system, and after verification succeeds, the kernel is started.

However, the method used in the prior art has the following disadvantages: The external security unit needs to communicate with a smart mobile device by using an external interface, and a general mobile communications terminal does not provide such an external interface, and therefore an application range of the method used in the prior art is limited. Second, according to a starting solution, the kernel can be started as long as existence of the external security unit is verified before starting is performed. Therefore, in this solution, a possibility that unauthorized starting bypasses a security unit is relatively high, and kernel starting security is relatively low.

SUMMARY

Embodiments of present invention provides a trusted kernel starting method and apparatus, which are used to improve kernel starting security.

According to a first aspect, an embodiment of the present invention provides a trusted kernel starting method, including:

starting a security boot module boot loader;

invoking the boot loader to measure, according to a first security algorithm, whether a platform configuration register (PCR) partition is trusted;

invoking, if the PCR partition is trusted, the boot loader to read kernel code into a memory, and invoking the boot loader to measure, according to a first complete algorithm and a kernel code standard measurement value prestored in the PCR partition, whether the kernel code is trusted;

initializing, if the kernel code is trusted, the kernel code to trigger an initialized kernel to measure, according to a second complete algorithm, whether the boot loader is trusted; and starting the kernel if the boot loader is trusted.

With reference to the first aspect, in a first possible implementation manner of the first aspect, the method further includes:

acquiring a PCR partition standard measurement value prestored in an environment ENV partition; and the invoking the boot loader to measure, according to a first security algorithm, whether a platform configuration register (PCR) partition is trusted includes:

invoking the boot loader to calculate a PCR partition actual measurement value according to the first security algorithm, and measuring, by comparing whether the PCR partition actual measurement value is equal to the PCR partition standard measurement value, whether the PCR partition is trusted, where if the PCR partition actual measurement value is equal to the PCR partition standard measurement value, the PCR partition is trusted.

With reference to the first possible implementation manner of the first aspect, in a second possible implementation manner of the first aspect, the acquiring a PCR partition standard measurement value prestored in an environment ENV partition includes:

generating a root key based on a PIN entered by a user; and decrypting the ENV partition by using the root key, to acquire the standard measurement value, which is prestored in the ENC partition, of the PCR partition.

With reference to the first aspect or the first or second possible implementation manner of the first aspect, in a third possible implementation manner of the first aspect, the method further includes:

acquiring the kernel code standard measurement value prestored in the PCR partition; and the invoking, if the PCR partition is trusted, the boot loader to read kernel code into a memory, and invoking the boot loader to measure, according to a first complete algorithm and a kernel code standard measurement value prestored in the PCR partition, whether the kernel code is trusted includes:

if the PCR partition is trusted, invoking the boot loader to read the kernel code into the memory, invoking the boot loader to calculate a kernel code actual measurement value according to the first complete algorithm, and measuring, by comparing whether the kernel code actual measurement value is equal to the kernel code standard measurement value, whether the kernel code is trusted, where if the kernel code actual measurement value is equal to the kernel code standard measurement value, the kernel code is trusted.

With reference to the first aspect or any one of the first to third possible implementation manners of the first aspect, in a fourth possible implementation manner of the first aspect, the method further includes:

acquiring a boot loader standard measurement value prestored in the PCR partition; and the initializing, if the kernel code is trusted, the kernel code to trigger an initialized kernel to measure, according to a second complete algorithm, whether the boot loader is trusted includes:

if the kernel code is trusted, initializing the kernel code to trigger the initialized kernel to calculate a boot loader actual measurement value according to the second complete algorithm, and measuring, by comparing whether the boot loader actual measurement value is equal to the boot loader standard measurement value, whether the boot loader is trusted, where if the boot loader actual measurement value is equal to the boot loader standard measurement value, the boot loader is trusted.

With reference to the first aspect or any one of the first to fourth possible implementation manners of the first aspect, in a fifth possible implementation manner of the first aspect, after the starting the kernel, the method further includes:

invoking the kernel to measure, according to a third complete algorithm, whether a kernel security management enhancement module is trusted; and starting an operating system if the kernel security management enhancement module is trusted.

With reference to the fifth possible implementation manner of the first aspect, in a sixth possible implementation manner of the first aspect, the method further includes:

acquiring a kernel security management enhancement module standard measurement value prestored in the PCR partition; and the invoking the kernel to measure, according to a third complete algorithm, whether a kernel security management enhancement module is trusted includes:

invoking the kernel to calculate a kernel security management enhancement module actual measurement value according to the third complete algorithm, and measuring, by comparing whether the kernel security management enhancement module actual measurement value is equal to the kernel security management enhancement module standard measurement value, whether the kernel security management enhancement module is trusted, where if the kernel security management enhancement module actual measurement value is equal to the kernel security management enhancement module standard measurement value, the kernel security management enhancement module is trusted.

With reference to the fifth or sixth possible implementation manner of the first aspect, in a seventh possible implementation manner of the first aspect, after the starting an operating system, the method further includes:

invoking the kernel security management enhancement module to measure, according to a fourth complete algorithm, whether an application program to be started is trusted; and starting the application program if the application program is trusted.

With reference to the seventh possible implementation manner of the first aspect, in an eighth possible implementation manner of the first aspect, the method further includes:

acquiring a standard measurement value, which is prestored in the PCR partition, of the application program; and the invoking the kernel security management enhancement module to measure, according to a fourth complete algorithm, whether an application program to be started is trusted includes:

invoking the kernel security management enhancement module to calculate a actual measurement value of the application program according to the fourth complete algorithm, and measuring, by comparing whether the actual measurement value of the application program is equal to the standard measurement value of the application program, whether the application program is trusted, where if the actual measurement value of the application program is equal to the standard measurement value of the application program, the application program is trusted.

According to a second aspect, an embodiment of the present invention provides another trusted kernel starting method, including:

starting a security boot module boot loader;

invoking the boot loader to measure, according to a first security algorithm, whether a platform configuration register (PCR) partition is trusted;

invoking, if the PCR partition is trusted, the boot loader to read kernel code into a memory, and invoking the boot loader to measure, according to a first complete algorithm and a kernel code standard measurement value prestored in the PCR partition, whether the kernel code is trusted; and if the kernel code is trusted, running the kernel code to start the kernel.

With reference to the second aspect, in a first possible implementation manner of the second aspect, after the running the kernel code to start a kernel, the method further includes:

invoking the kernel to measure, according to a second complete algorithm, whether the boot loader is trusted;

if the boot loader is trusted, invoking the kernel to measure, according to a third complete algorithm, whether a kernel security management enhancement module is trusted; and starting an operating system if the kernel security management enhancement module is trusted.

With reference to the second aspect or the first possible implementation manner of the second aspect, in a second possible implementation manner of the second aspect, the method further includes:

acquiring a PCR partition standard measurement value prestored in an environment ENV partition; and the invoking the boot loader to measure, according to a first security algorithm, whether a platform configuration register (PCR) partition is trusted includes:

invoking the boot loader to calculate a PCR partition actual measurement value according to the prestored first security algorithm, and measuring, by comparing whether the PCR partition actual measurement value is equal to the PCR partition standard measurement value, whether the PCR partition is trusted, where if the PCR partition actual measurement value is equal to the PCR partition standard measurement value, the PCR partition is trusted.

With reference to the second possible implementation manner of the second aspect, in a third possible implementation manner of the second aspect, the acquiring a PCR partition standard measurement value prestored in an environment ENV partition includes:

generating a root key based on a PIN entered by a user; and decrypting the ENV partition by using the root key, to acquire the standard measurement value, which is prestored in the ENV partition, of the PCR partition.

With reference to the second aspect or any one of the first to third possible implementation manners of the second aspect, in a fourth possible implementation manner of the second aspect, the method further includes:

acquiring the kernel code standard measurement value prestored in the PCR partition; and the invoking, if the PCR partition is trusted, the boot loader to read kernel code into a memory, and invoking the boot loader to measure, according to a first complete algorithm and a kernel code standard measurement value prestored in the PCR partition, whether the kernel code is trusted includes:

if the PCR partition is trusted, invoking the boot loader to read the kernel code into the memory, invoking the boot loader to calculate a kernel code actual measurement value according to the first complete algorithm, and measuring, by comparing whether the kernel code actual measurement value is equal to the kernel code standard measurement value, whether the kernel code is trusted, where if the kernel code actual measurement value is equal to the kernel code standard measurement value, the kernel code is trusted.

With reference to any one of the first to fourth possible implementation manners of the second aspect, in a fifth possible implementation manner of the second aspect, the method further includes:

acquiring a boot loader standard measurement value prestored in the PCR partition; and the invoking the kernel to measure, according to a second complete algorithm, whether the boot loader is trusted includes:

invoking the kernel to calculate a boot loader actual measurement value according to the second complete algorithm, and measuring, by comparing whether the boot loader actual measurement value is equal to the boot loader standard measurement value, whether the boot loader is trusted, where if the boot loader actual measurement value is equal to the boot loader standard measurement value, the boot loader is trusted.

With reference to any one of the first to fifth possible implementation manners of the second aspect, in a sixth possible implementation manner of the second aspect, the method further includes:

acquiring a kernel security management enhancement module standard measurement value prestored in the PCR partition; and the invoking the kernel to measure, according to a third complete algorithm, whether a kernel security management enhancement module is trusted includes:

invoking the kernel to calculate a kernel security management enhancement module actual measurement value according to the third complete algorithm, and measuring, by comparing whether the kernel security management enhancement module actual measurement value is equal to the kernel security management enhancement module standard measurement value, whether the kernel security management enhancement module is trusted, where if the kernel security management enhancement module actual measurement value is equal to the kernel security management enhancement module standard measurement value, the kernel security management enhancement module is trusted.

With reference to any one of the first to sixth possible implementation manners of the second aspect, in a seventh possible implementation manner of the second aspect, after the starting an operating system, the method further includes:

invoking the kernel security management enhancement module to measure, according to a fourth complete algorithm, whether an application program to be started is trusted; and starting the application program if the application program is trusted.

With reference to the seventh possible implementation manner of the second aspect, in an eighth possible implementation manner of the second aspect, the method further includes:

acquiring a standard measurement value, which is prestored in the PCR partition, of the application program; and the invoking the kernel security management enhancement module to measure, according to a fourth complete algorithm, whether an application program to be started is trusted includes:

invoking the kernel security management enhancement module to calculate a actual measurement value of the application program according to the fourth complete algorithm, and measuring, by comparing whether the actual measurement value of the application program is equal to the standard measurement value of the application program, whether the application program is trusted, where if the actual measurement value of the application program is equal to the standard measurement value of the application program, the application program is trusted.

According to a third aspect, an embodiment of the present invention provides a trusted kernel starting apparatus, including:

a boot starting module, configured to start a security boot module boot loader;

a first measurement module, configured to invoke the boot loader to measure, according to a first security algorithm, whether a platform configuration register (PCR) partition is trusted, where the first measurement module is further configured to invoke, if the PCR partition is trusted, the boot loader to read kernel code into a memory, and invoke the boot loader to measure, according to a first complete algorithm and a kernel code standard measurement value prestored in the PCR partition, whether the kernel code is trusted;

a second measurement module, configured to initialize, if the kernel code is trusted, the kernel code to trigger an initialized kernel to measure, according to a second complete algorithm, whether the boot loader is trusted; and a kernel starting module, configured to start the kernel if the boot loader is trusted.

With reference to the third aspect, in a first possible implementation manner of the third aspect, the apparatus further includes:

an acquiring module, configured to acquire a PCR partition standard measurement value prestored in an environment ENV partition, where the first measurement module is specifically configured to invoke the boot loader to calculate a PCR partition actual measurement value according to the first security algorithm, and measure, by comparing whether the PCR partition actual measurement value is equal to the PCR partition standard measurement value, whether the PCR partition is trusted, wherein if the PCR partition actual measurement value is equal to the PCR partition standard measurement value, it is determined that the PCR partition is trusted.

With reference to the first possible implementation manner of the third aspect, in a second possible implementation manner of the third aspect, the acquiring module is specifically configured to generate a root key based on a PIN entered by a user, and decrypt the ENV partition by using the root key, to acquire the standard measurement value, which is prestored in the ENC partition, of the PCR partition.

With reference to the third aspect or the first or second possible implementation manner of the third aspect, in a third possible implementation manner of the third aspect, the acquiring module is further configured to acquire the standard measurement value which is prestored in the PCR partition, of the kernel code; and the first measurement module is specifically configured to: if the PCR partition is trusted, invoke the boot loader to read the kernel code into the memory, invoke the boot loader to calculate a kernel code actual measurement value according to the first complete algorithm, and measure, by comparing whether the kernel code actual measurement value is equal to the kernel code standard measurement value, whether the kernel code is trusted, where if the kernel code actual measurement value is equal to the kernel code standard measurement value, the kernel code is trusted.

With reference to the third aspect or any one of the first to third possible implementation manners of the third aspect, in a fourth possible implementation manner of the third aspect, the acquiring module is further configured to acquire a boot loader standard measurement value prestored in the PCR partition; and the second measurement module is specifically configured to: if the kernel code is trusted, initialize the kernel code to trigger the initialized kernel to calculate a boot loader actual measurement value according to the second complete algorithm, and measure, by comparing whether the boot loader actual measurement value is equal to the boot loader standard measurement value, whether the boot loader is trusted, where if the boot loader actual measurement value is equal to the boot loader standard measurement value, the boot loader is trusted.

With reference to the third aspect or any one of the first to fourth possible implementation manners of the third aspect, in a fifth possible implementation manner of the third aspect, the apparatus further includes a system starting module, where the second measurement module is further configured to invoke the kernel to measure, according to a third complete algorithm, whether a kernel security management enhancement module is trusted; and the system starting module is configured to start an operating system if the kernel security management enhancement module is trusted.

With reference to the fifth possible implementation manner of the third aspect, in a sixth possible implementation manner of the third aspect, the acquiring module is further configured to acquire a kernel security management enhancement module standard measurement value prestored in the PCR partition; and the second measurement module is specifically configured to invoke the kernel to calculate a kernel security management enhancement module actual measurement value according to the third complete algorithm, and measure, by comparing whether the kernel security management enhancement module actual measurement value is equal to the kernel security management enhancement module standard measurement value, whether the kernel security management enhancement module is trusted, where if the kernel security management enhancement module actual measurement value is equal to the kernel security management enhancement module standard measurement value, the kernel security management enhancement module is trusted.

With reference to the fifth or sixth possible implementation manner of the third aspect, in a seventh possible implementation manner of the third aspect, the apparatus further includes:

a third measurement module, configured to invoke the kernel security management enhancement module to measure, according to a fourth complete algorithm, whether an application program to be started is trusted; and an application program starting module, configured to start the application program if the application program is trusted.

With reference to the seventh possible implementation manner of the third aspect, in an eighth possible implementation manner of the third aspect, the acquiring module is further configured to acquire a standard measurement value, which is prestored in the PCR partition, of the application program; and the third measurement module is specifically configured to invoke the kernel security management enhancement module to calculate a actual measurement value of the application program according to the fourth complete algorithm, and measure, by comparing whether the actual measurement value of the application program is equal to the standard measurement value of the application program, whether the application program is trusted, where if the actual measurement value of the application program is equal to the standard measurement value of the application program, the application program is trusted.

According to a fourth aspect, an embodiment of the present invention provides another trusted kernel starting apparatus, including:

a boot starting unit, configured to start a security boot module boot loader;

a first measurement unit, configured to invoke the boot loader to measure, according to a first security algorithm, whether a platform configuration register (PCR) partition is trusted, where the first measurement unit is further configured to invoke, if the PCR partition is trusted, the boot loader to read kernel code into a memory, and invoke the boot loader to measure, according to a first complete algorithm and a kernel code standard measurement value prestored in the PCR partition, whether the kernel code is trusted; and a kernel starting unit, configured to: if the kernel code is trusted, run the kernel code to start a kernel.

With reference to the fourth aspect, in a first possible implementation manner of the fourth aspect, the apparatus further includes:

a second measurement unit, configured to invoke the kernel to measure, according to a second complete algorithm, whether the boot loader is trusted, where the second measurement unit is further configured to: if the boot loader is trusted, invoke the kernel to measure, according to a third complete algorithm, whether a kernel security management enhancement module is trusted; and a system starting unit, configured to start an operating system if the kernel security management enhancement module is trusted.

With reference to the fourth aspect or the first possible implementation manner of the fourth aspect, in a second possible implementation manner of the fourth aspect, the apparatus further includes:

an acquiring unit, configured to acquire a PCR partition standard measurement value prestored in an environment ENV partition, where the first measurement unit is specifically configured to invoke the boot loader to calculate a PCR partition actual measurement value according to the prestored first security algorithm, and measure, by comparing whether the PCR partition actual measurement value is equal to the PCR partition standard measurement value, whether the PCR partition is trusted, where if the PCR partition actual measurement value is equal to the PCR partition standard measurement value, the PCR partition is trusted.

With reference to the second possible implementation manner of the fourth aspect, in a third possible implementation manner of the fourth aspect, the acquiring unit is specifically configured to generate a root key based on a PIN entered by a user, and decrypt the ENV partition by using the root key, to acquire the standard measurement value, which is prestored in the ENC partition, of the PCR partition.

With reference to the fourth aspect or any one of the first to third possible implementation manners of the fourth aspect, in a fourth possible implementation manner of the fourth aspect, the acquiring unit is further configured to acquire the kernel code standard measurement value prestored in the PCR partition; and the first measurement unit is specifically configured to: if the PCR partition is trusted, invoke the boot loader to read the kernel code into the memory, invoke the boot loader to calculate a kernel code actual measurement value according to the first complete algorithm, and measure, by comparing whether the kernel code actual measurement value is equal to the kernel code standard measurement value, whether the kernel code is trusted, where if the kernel code actual measurement value is equal to the kernel code standard measurement value, the kernel code is trusted.

With reference to any one of the first to fourth possible implementation manners of the fourth aspect, in a fifth possible implementation manner of the fourth aspect, the acquiring unit is further configured to acquire a boot loader standard measurement value prestored in the PCR partition; and the second measurement unit is specifically configured to invoke the kernel to calculate a boot loader actual measurement value according to the second complete algorithm, and measure, by comparing whether the boot loader actual measurement value is equal to the boot loader standard measurement value, whether the boot loader is trusted, where if the boot loader actual measurement value is equal to the boot loader standard measurement value, the boot loader is trusted.

With reference to any one of the first to fifth possible implementation manners of the fourth aspect, in a sixth possible implementation manner of the fourth aspect, the acquiring unit is further configured to acquire a kernel security management enhancement module standard measurement value prestored in the PCR partition; and the second measurement unit is specifically configured to invoke the kernel to calculate a kernel security management enhancement module actual measurement value according to the third complete algorithm, and measure, by comparing whether the kernel security management enhancement module actual measurement value is equal to the kernel security management enhancement module standard measurement value, whether the kernel security management enhancement module is trusted, where if the kernel security management enhancement module actual measurement value is equal to the kernel security management enhancement module standard measurement value, the kernel security management enhancement module is trusted.

With reference to the first to sixth possible implementation manners of the fourth aspect, in a seventh possible implementation manner of the fourth aspect, the apparatus further includes:

a third measurement unit, configured to invoke the kernel security management enhancement module to measure, according to a fourth complete algorithm, whether an application program to be started is trusted; and an application program starting unit, configured to start the application program if the application program is trusted.

With reference to the seventh possible implementation manner of the fourth aspect, in an eighth possible implementation manner of the fourth aspect, the third measurement unit is specifically configured to invoke the kernel security management enhancement module to calculate a actual measurement value of the application program according to the fourth complete algorithm, and measure, by comparing whether the actual measurement value of the application program is equal to the standard measurement value of the application program, whether the application program is trusted, where if the actual measurement value of the application program is equal to the standard measurement value of the application program, the application program is trusted.

It can be learned that, according to the trusted kernel starting method and apparatus that are provided in the embodiments of the present invention, a security boot module boot loader is first invoked to measure whether a platform configuration register (PCR) partition is trusted; after it is determined that the PCR partition is trusted, the boot loader is invoked to measure, according to a first complete algorithm and a standard measurement value, which is prestored in the PCR partition, of a kernel code, whether the kernel code is trusted; after it is determined that the kernel code is trusted, the kernel code is then initialized to trigger an initialized kernel to measure, according to a second complete algorithm, whether the boot loader is trusted; and after it is determined that the boot loader is trusted, the kernel is started. That is, according to the technical solutions provided in the embodiments of the present invention, a kernel can be securely started only when a security boot module boot loader, a platform configuration register (PCR) partition, and kernel code are all trusted, credibility of the kernel code is measured by the boot loader according to a kernel code standard measurement value prestored in the PCR partition, and the kernel code is initialized to trigger the kernel to measure credibility of the boot loader. Therefore, the technical solutions provided in the embodiments of the present invention can improve kernel starting security to some extent.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present disclosure.

Figure 1:
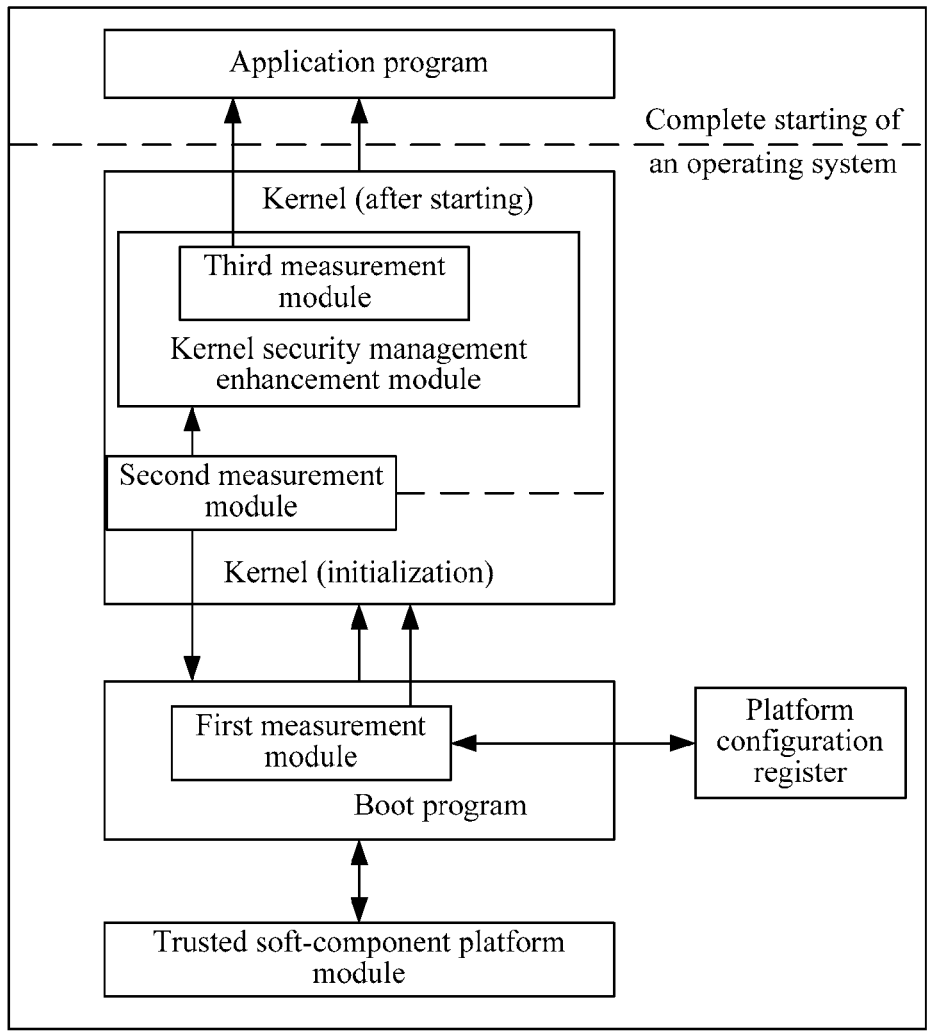
FIG. 1 is a flowchart for starting a system according to an embodiment of the present invention.

FIG. 1 is a flowchart for starting a system according to an embodiment of the present invention. With reference to a trusted kernel starting method provided in the embodiments of the present invention, through comparison, a difference between a structural diagram shown in this embodiment and an embedded system procedure in the prior art lies in that: a trusted soft-component platform module is additionally set in a procedure of starting the existing embedded system. The trusted soft-component platform module may control performing of a process in which a boot loader measures a PCR partition and a kernel, measurement of a boot loader and a kernel security management enhancement module by a kernel, and measurement of an application program by a kernel security management enhancement module, where these processes are in methods shown in FIG. 2.

The system starting procedure is summarized as: After the system is powered on, a security boot program, that is, a boot loader is started, and the trusted soft-component platform module invokes the boot loader to measure a platform location register PCR partition. If the current PCR partition is trusted, the trusted soft-component platform module continues to invoke the boot loader to measure the kernel. If the current kernel is trusted, the trusted soft-component platform module instructs the boot loader to load the kernel and initializes the kernel, and then invokes the initialized kernel to measure the boot loader again. If the boot loader is trusted in this case, the trusted soft-component platform module instructs the kernel to start, and measures the kernel security management enhancement module. If measurement of the measured kernel security management enhancement module is trusted currently, the trusted soft-component platform module instructs the kernel to load the kernel security management enhancement module, and then measures, by using the kernel security management enhancement module, an application program to be started. If a measurement result is trusted, the application program is normally started. The boot loader measures the PCR partition and the kernel respectively according to a first security algorithm and a first complete algorithm by using a first measurement module. The kernel measures the boot loader and the kernel management enhancement module respectively according to a second complete algorithm and a third complete algorithm by using a second measurement module. The kernel management enhancement module measures the application program according to a fourth complete algorithm by using a third measurement module. Securely starting a trusted embedded system can be implemented by using such a method of performing starting level by level after performing measurement level by level.

Figure 2A:
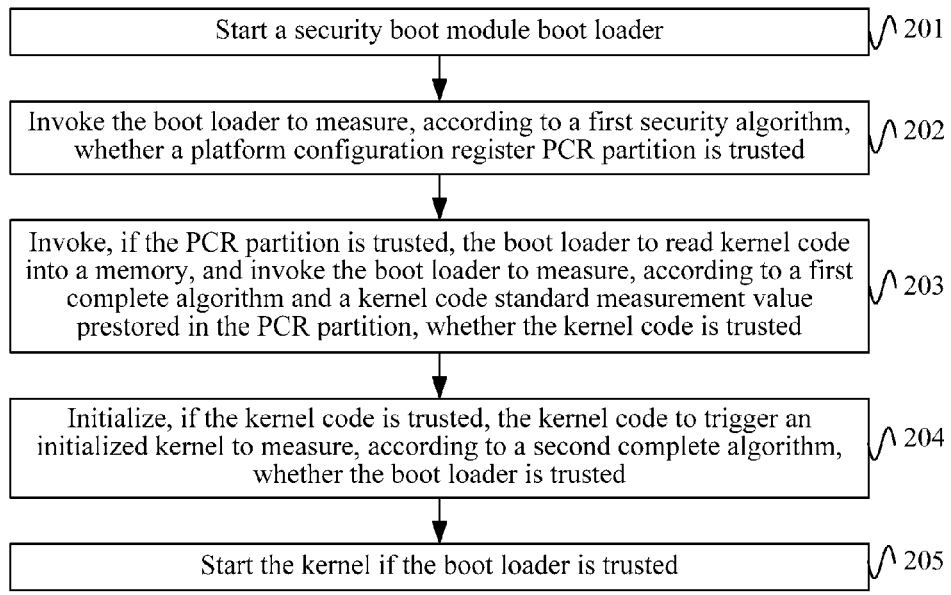
FIG. 2a is a flowchart of a trusted kernel starting method according to an embodiment of the present invention.

FIG. 2a is a flowchart of a trusted kernel starting method according to an embodiment of the present invention. As shown in FIG. 2a, the trusted kernel starting method specifically includes:

S201: Start a security boot module boot loader.

Currently, an embedded system used in a terminal device, such as a PC, a mobile phone, or an iPad, mainly includes the following function modules: a boot program (boot Loader), a kernel (Kernel), and a kernel security management module. After the function modules in the embedded system are normally started, a user may invoke various application programs to perform corresponding operations.

In this embodiment, after the terminal device is powered on, an order of starting the function modules is: a security boot module (boot Loader) stored in a storage is first loaded into the embedded system in the device to start the boot Loader. Specifically, in this embodiment, a complete process of starting the boot loader is divided into three parts: a BL 0 (boot loader 0) part, a BL 1 (boot loader 1) part, and a BL 2 (boot loader 2) part.

A BL 0 refers to starting code built into an iROM of S5PV210. When the system is just powered on, an entire state of the system is not initialized, and an internal clock is not set. In this case, only an iRAM is available. If a power supply normally supplies power in this case, the starting procedure will start from the starting code built into the iROM. The starting code built into the iROM is hardware related code. Generally, the starting code is built into a corresponding hardware device in a hardware manner, which cannot be changed by a user. The starting code is responsible for initializing the clock of the system, setting a watch dog, initializing a heap and a stack, and loading a BL 1.

The BL 1 refers to code of the first 16 K (a maximum is 16 K) of a binary file uboot.bin that is automatically copied from an ex-patulous storage (nand/sd/usb) by the iRAM. A role of the BL 1 is detecting and initializing an external RAM, closing a Cache, setting a stack, and loading a BL 2.

The BL 2 refers to complete uboot code executed in a memory after code redirection, and is also referred to as a Main boot Loader. The code Main boot Loader is very important, includes file system initialization, network support, extra memory initialization, and other work, and is responsible for loading an operating system (OS) kernel (which is briefly referred to as a kernel subsequently).

A complete process of starting the boot loader may be described as: After being started, the BL 0 (the starting code built into the iROM) loads the BL 1 (the code of the first 16 KB of the boot loader) to the iRAM. Then, the BL 1 runs in the iRAM and loads the BL 2 (a remaining boot loader) to a memory (an SDRAM); and the BL 2 loads the kernel, and enables the OS to run in the SDRAM, so that the OS finally runs in the SDRAM.

The starting a security boot module boot loader in this step refers to starting the BL 0 part and the BL 1 part that are in the boot Loader after the system is powered on and the boot loader in the storage is loaded.

S202: Invoke the boot loader to measure, according to a first security algorithm, whether a platform configuration register (PCR) partition is trusted.

In this embodiment, after the system starts the BL 0 part and the BL 1 part that are in the boot Loader, and before the system executes the BL 2 part, that is, loads the kernel, the system instructs the boot loader to measure, according to the first security algorithm, whether a PCR partition is trusted. Related parameters, such as standard measurement values used to measure integrity or security of nodes, needed by nodes (such as a boot loader, a kernel, and a kernel security management enhancement module) in the system starting process are prestored in the PCR partition. These standard measurement values may be proactively reported by the nodes to the system in a process of starting the system for the first time, and the system stores the standard measurement values in a specified storage unit in the system.

Specifically, the first security algorithm may be packaged and stored in a storage unit in the system. After the boot loader completes performing of the BL 1 process, the boot loader may trigger reminding the system that the current BL 1 process is already completed. After receiving a triggering signal, the system invokes the boot loader to measure, according to the first security algorithm prestored in the storage unit, credibility of the PCR partition.

Specifically, the first security algorithm may be specifically, for example, a secure hash algorithm (sha1) or a domestic SM3 hash algorithm, and the measurement principle of the first security algorithm may be described as: calculation is performed on an object to be measured, for example, an image file, by using the foregoing two algorithms, to obtain a measurement value (that is, a digest value of the measured object, where a digest value of a measured object corresponding to the sha1 algorithm is 160 bits, and a digest value of a measured object corresponding to the SM3 algorithm is 256 bits) of the current measured object, where the measurement value is a unique value, which is obtained through calculation by using a corresponding algorithm, of a measured object. If a measurement value of a measured object changes, it may be considered that the measured object has changed or has been modified. Similarly, a process in which the boot loader measures, according to the first security algorithm, whether the PCR partition is trusted is described as: The boot loader reads, as a measured object, an image file of the PCR partition into a memory, and calculates a measurement value of the PCR partition by using the first security algorithm, where if the measurement value does not change, it indicates that the PCR partition does not change, and is secure and trusted. On the contrary, if the measurement value changes, it indicates that the PCR partition may have been artificially modified viciously and changes; in this case, security of related data stored in the PCR partition is also questionable. To ensure security of a running environment of an entire system, the boot loader notifies the system that PCR security measurement fails, and reminds the system to stop the system starting process and power off the device.

The first security algorithm used in the process of actually measuring credibility of the PCR partition may further be any algorithm of an MTV5 algorithm, an SHA2 algorithm, an SHA256 algorithm, and an MD algorithm. A method and the principle of measuring credibility of the first security algorithm are the same as those of sha1 and SM3, only that specific calculation processes differ as specific algorithm types differ. According to an understanding level of persons skilled in the art, based on the same principle, credibility of the PCR partition is measured by using the foregoing method, and details are not described herein again.

S203: Invoke, if the PCR partition is trusted, the boot loader to read kernel code into a memory, and invoke the boot loader to measure, according to a first complete algorithm and a kernel code standard measurement value prestored in the PCR partition, whether the kernel code is trusted.

Specifically, when the measurement value of the PCR partition is calculated by using the first security algorithm, after it is determined according to the measurement value that the PCR partition is trusted, the system invokes the boot loader to read the kernel code into the memory, uses the kernel code as a measured object, and determines, by invoking the boot loader to match and calculate, according to the first complete algorithm prestored in the storage unit, a value relationship between a kernel code actual measurement value and a kernel code standard measurement value prestored in the PCR partition, whether the kernel code is trusted. The first complete algorithm may be one of the first security algorithms listed in step 202, and for the method and principle of measuring credibility of the kernel code by the boot loader according to the first complete algorithm, reference may be made to corresponding content of the process of measuring credibility of the PCR partition according to the first security algorithm in step 202, and details are not described herein again.

S204: Initialize, if the kernel code is trusted, the kernel code to trigger an initialized kernel to measure, according to a second complete algorithm, whether the boot loader is trusted.

Specifically, after the first complete algorithm is used to measure that the kernel code is secure and trusted, the system invokes the boot loader to perform the BL 2 process to load the kernel. At an early stage of loading the kernel, the kernel code for loading first needs to be initialized. Different from the prior art, in this embodiment of the present invention, after completing initialization of the kernel code, the system first triggers the initialized kernel to measure, according to the second complete algorithm, whether the boot loader is trusted; the second complete algorithm, like the first complete algorithm, is also prestored in the storage unit in the system, and a type of an algorithm that is specifically referenced by the second complete algorithm may be the same as a type of an algorithm that is referenced by the first complete algorithm, or the algorithm that is specifically referenced by the second complete algorithm is any one of the foregoing listed algorithms; and a specific measurement process of the second complete algorithm is also the same as the method and principle of measuring credibility of the kernel code by using the first complete algorithm, and details are not described herein again in this embodiment. On the contrary, if the first complete algorithm is used to measure that the kernel code is untrusted, the boot loader notifies the system that system kernel security measurement fails, and reminds the system to stop the system starting process and power off the device.

S205: Start the kernel if the boot loader is trusted.

Specifically, after the initialized kernel uses the second complete algorithm to measure that the boot loader is trusted, the system completely starts the kernel code and enables the OS to run in the SDRAM, so that the OS finally runs in the SDRAM. On the contrary, if the initialized kernel uses the second complete algorithm to measure that the boot loader is untrusted, the kernel notifies the system that boot loader security measurement fails, and reminds the system to stop the system starting process and power off the device.

According to the trusted kernel starting method provided in embodiments of the present invention, a security boot module boot loader is started; the boot loader is invoked to measure, according to a first security algorithm, whether a PCR partition is trusted; if the PCR partition is trusted, the boot loader is invoked to read kernel code into a memory, and the boot loader is invoked to measure, according to a first complete algorithm and a kernel code standard measurement value prestored in the PCR partition, whether the kernel code is trusted; if the kernel code is trusted, the kernel code is initialized to trigger an initialized kernel to measure, according to a second complete algorithm, whether the boot loader is trusted; and if the boot loader is trusted, the kernel is started. In this solution, kernel starting security is improved to some extent.

Figure 2B:
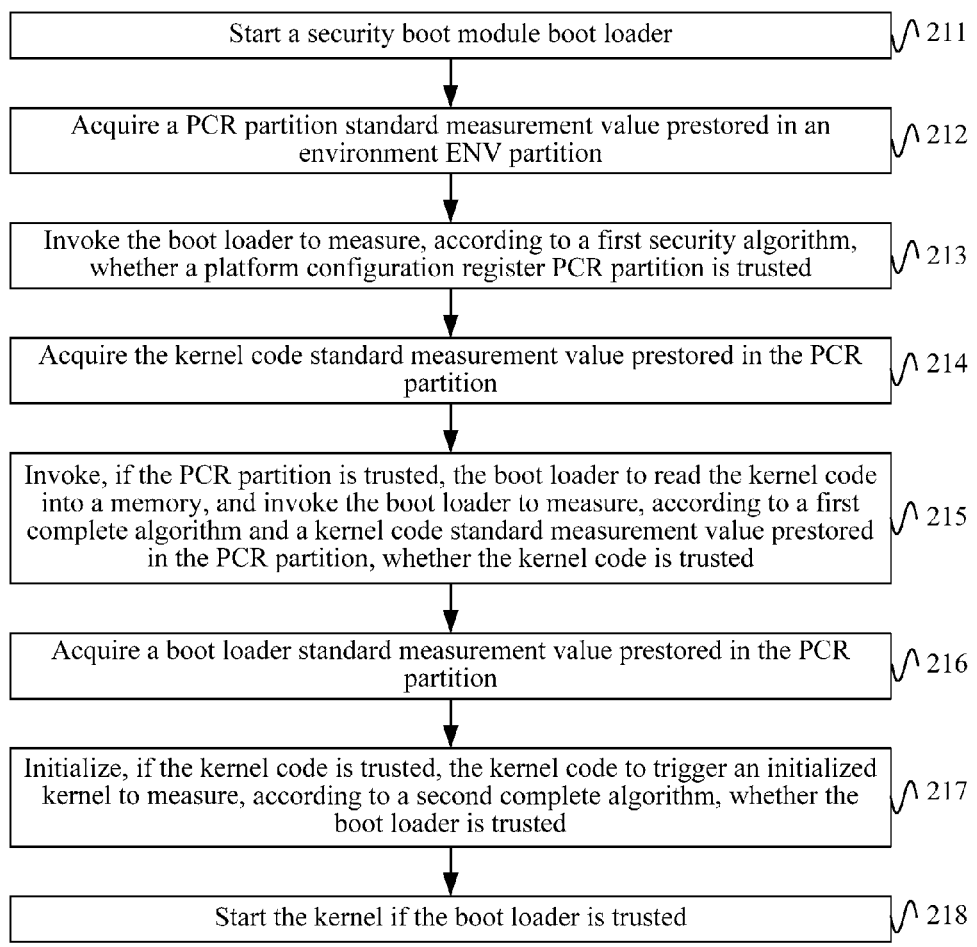
FIG. 2b is a flowchart of another trusted kernel starting method according to an embodiment of the present invention.

FIG. 2b is a flowchart of a trusted kernel starting method according to another embodiment of the present invention. The trusted kernel starting method in this embodiment is a specific implementation manner of the embodiment shown in FIG. 2a. As shown in FIG. 2b, the trusted kernel starting method specifically includes:

S211: Start a security boot module boot loader. For a specific process of performing this step, reference may be made to corresponding content of step 201.

S212: Acquire a standard measurement value, which is prestored in an environment ENV partition, of a PCR partition.

Before step 202 in the embodiment shown in FIG. 2a, a system may further first acquire the standard measurement value, which is prestored in the environment ENV partition, of the PCR partition, where the standard measurement value is a measurement value that is generated, by calculating, by using a first security algorithm, when the PCR partition stores for the first time related parameters needed by nodes when the system is started, an image file that corresponds to the current PCR partition.

Specifically, a specific process of the acquiring a standard measurement value, which is prestored in an environment ENV partition, of a PCR partition is as follows:

1. Generate a root key based on a PIN entered by a user.

When the system is powered on and runs for the first time, the system first receives standard measurement values that are sent by key nodes such as a boot loader and a kernel in the system and that are used to measure security of the key nodes; then, the standard measurement values are stored in a PCR partition in a storage device, for future measurement reference. Then, the system uses the first security algorithm to calculate a standard measurement value P (20 Bytes) of the image file that corresponds to the PCR partition, where the standard measurement value is encrypted by using a device root key SRK to generate an ENC{P}, and the ENC{P} is stored at the last 20 bytes of the ENV partition. The root key is mastered by the user; and each time the system is started, the user may input a corresponding root key seed, that is, a PIN, so that the system generates the root key.

2. Decrypt the ENV partition by using the root key, to acquire the standard measurement value, which is prestored in the ENV partition, of the PCR partition.

After the boot Loader completes the BL 1 process, the system receives the PIN entered by the user, and generates an SRK according to the PIN, so that decryption is performed at the last 20 bytes of the ENV partition.

If the PIN entered by the user is correct, the system generates the SRK according to the PIN, so that it can be implemented that the ENC{P} in the ENV partition is successfully decrypted, and a value P is acquired. The value P is the standard measurement value corresponding to the PCR partition. Whether the PCR partition is trusted may be determined by comparing P and a PCR partition actual measurement value. In this way, even if an unauthorized user tampers with any information in the PCR partition, the unauthorized user still cannot tamper with a corresponding ENC{P}. Therefore, once the PCR partition is tampered with, this case can be found, and the system is further prompted to stop the current starting process.

S213: Invoke the boot loader to measure, according to a first security algorithm, whether a PCR partition is trusted. For a specific process of performing this step, reference may be made to corresponding content of step 202.

Specifically, a specific process in which the boot loader measures, according to the first security algorithm, whether the PCR partition is trusted may be as follows: First, the first security algorithm is used to calculate an image file of a measured object, that is, the PCR partition, to obtain a actual measurement value of the current PCR partition. The boot loader determines, by comparing whether the PCR partition actual measurement value is equal to the PCR partition standard measurement value, whether the PCR partition changes in the two times of measurement, so as to determine whether the PCR partition is trusted. If the PCR partition actual measurement value is equal to the PCR partition standard measurement value, it indicates that the PCR partition does not change, and an environment of the PCR partition is secure and trusted.

S214: Acquire a kernel code standard measurement value prestored in the PCR partition.

Before step 203 in the embodiment shown in FIG. 2a, the system may further first acquire the kernel code standard measurement value from the PCR partition, where the standard measurement value is proactively reported by the kernel to the system, when the system is started for the first time, after the kernel calculates, according to the first complete algorithm, a standard value corresponding to the kernel, and is stored in the PCR partition by the system.

S215: Invoke, if the PCR partition is trusted, the boot loader to read the kernel code into a memory, and invoke the boot loader to measure, according to a first complete algorithm and the kernel code standard measurement value prestored in the PCR partition, whether the kernel code is trusted. For a specific process of performing this step, reference may be made to corresponding content of step 203.

Specifically, if the PCR partition is trusted, the system invokes the boot loader to read the kernel code into the memory, invokes the boot loader to calculate a kernel code actual measurement value according to the first complete algorithm, and measures, by comparing whether the kernel code actual measurement value is equal to the standard measurement value, which is obtained from the PCR partition, of the kernel code, whether the kernel code is trusted, where if the kernel code actual measurement value is equal to the kernel code standard measurement value, it indicates that the kernel code is trusted.

S216: Acquire a boot loader standard measurement value prestored in the PCR partition.

Before step 204 in the embodiment shown in FIG. 2a, the system may further first acquire the boot loader standard measurement value from the PCR partition, where the standard measurement value is proactively reported by the boot loader to the system, when the system is started for the first time, after the boot loader calculates, according to the second complete algorithm, a standard value corresponding to the boot loader, and is stored in the PCR partition by the system.

S217: Initialize, if the kernel code is trusted, the kernel code to trigger an initialized kernel to measure, according to a second complete algorithm, whether the boot loader is trusted. For a specific process of performing this step, reference may be made to corresponding content of step 204.

Specifically, if the kernel code is trusted, the system first initializes the kernel code to trigger the initialized kernel to calculate a boot loader actual measurement value according to the second complete algorithm, and measures, by comparing whether the boot loader actual measurement value is equal to the standard measurement value, which is obtained from the PCR partition, of the boot loader, whether the boot loader is trusted, where if the boot loader actual measurement value is equal to the boot loader standard measurement value, it indicates that the boot loader is trusted.

S218: Start the kernel if the boot loader is trusted. For a specific process of performing this step, reference may be made to corresponding content of step 105.

According to the trusted kernel starting method provided in embodiments of the present invention, a security boot module boot loader is started; the boot loader is invoked to measure, according to a first security algorithm, whether a PCR partition is trusted; if the PCR partition is trusted, the boot loader is invoked to read kernel code into a memory, and the boot loader is invoked to measure, according to a first complete algorithm and a kernel code standard measurement value prestored in the PCR partition, whether the kernel code is trusted; if the kernel code is trusted, the kernel code is initialized to trigger an initialized kernel to measure, according to a second complete algorithm, whether the boot loader is trusted; and if the boot loader is trusted, the kernel is started. In this solution, kernel starting security is improved to some extent.

Figure 2C:
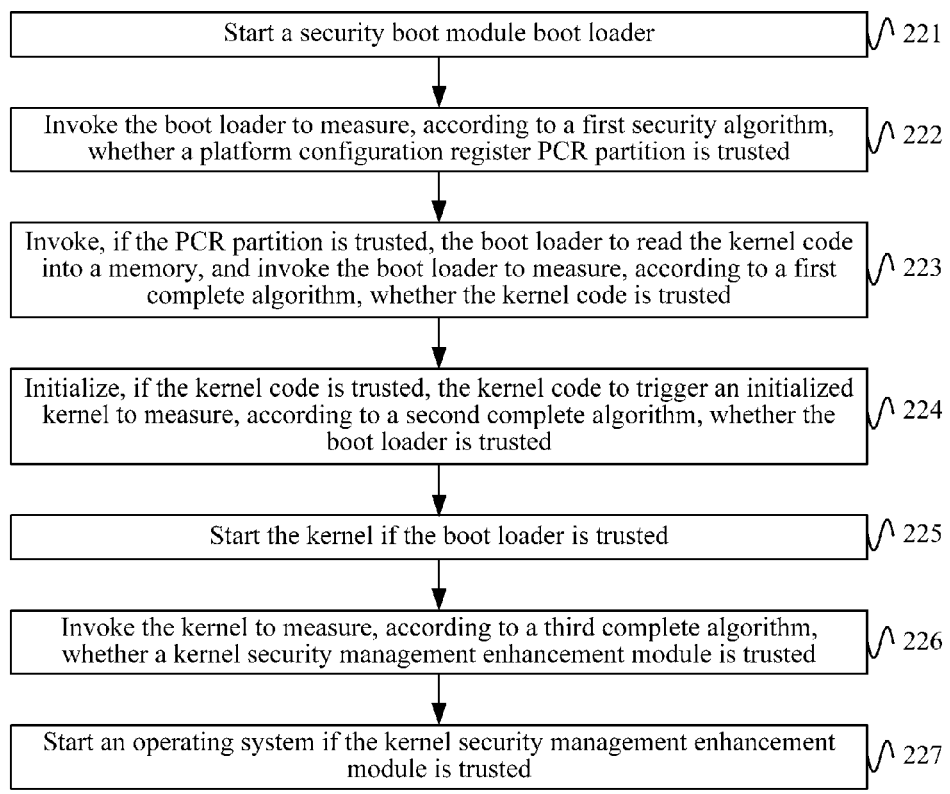
FIG. 2c is a flowchart of still another trusted kernel starting method according to an embodiment of the present invention.

FIG. 2c is a flowchart of still another trusted kernel starting method according to an embodiment of the present invention. The trusted kernel starting method in this embodiment is a specific implementation manner of the embodiment shown in FIG. 2a. As shown in FIG. 2c, for content of steps 221 to 225, reference may be made to corresponding content of steps 201 to 205, and details are not described herein again. In this embodiment, based on the method shown in FIG. 2a, after step 205, the trusted kernel starting method further includes:

S226: Invoke a kernel to measure, according to a third complete algorithm, whether a kernel security management enhancement module is trusted.

The third complete algorithm, like the first complete algorithm, is also prestored in a storage unit in the system, and a type of an algorithm that is specifically referenced by the third complete algorithm may be the same as a type of an algorithm that is referenced by the first complete algorithm, or the algorithm that is specifically referenced by the third complete algorithm is any one of the foregoing listed algorithms; and a specific measurement process of the third complete algorithm is also the same as the method and principle of measuring credibility of the kernel code by using the first complete algorithm, and details are not described herein again in this embodiment.

Specifically, after starting the kernel is completed, the system may continue to invoke the kernel to measure, according to the third complete algorithm, whether the kernel security management enhancement module is trusted.

A specific measurement method is: the system first acquires a kernel security management enhancement module standard measurement value from the PCR partition, where the standard measurement value is proactively reported by the kernel security management enhancement module to the system, when the system is started for the first time, after the kernel security management enhancement module uses an image file corresponding to the kernel security management enhancement module as a measured object and calculates, according to the third complete algorithm, a standard value corresponding to the kernel security management enhancement module, and is stored in the PCR partition by the system.

In addition, the system invokes the kernel to calculate a current kernel security management enhancement module actual measurement value according to the third complete algorithm, and measures, by comparing whether the kernel security management enhancement module actual measurement value is equal to the standard measurement value, acquired from the PCR partition, of the kernel security management enhancement module, whether the kernel security management enhancement module is trusted, where if the kernel security management enhancement module actual measurement value is equal to the kernel security management enhancement module standard measurement value, it indicates that the kernel security management enhancement module is trusted.

S227: Start an operating system if the kernel security management enhancement module is trusted.

When the kernel security management enhancement module is trusted, the kernel dynamically loads the kernel security management enhancement module, and starts the entire system, which includes all programs that need to run in a normal working environment of the system.

Figure 2D:
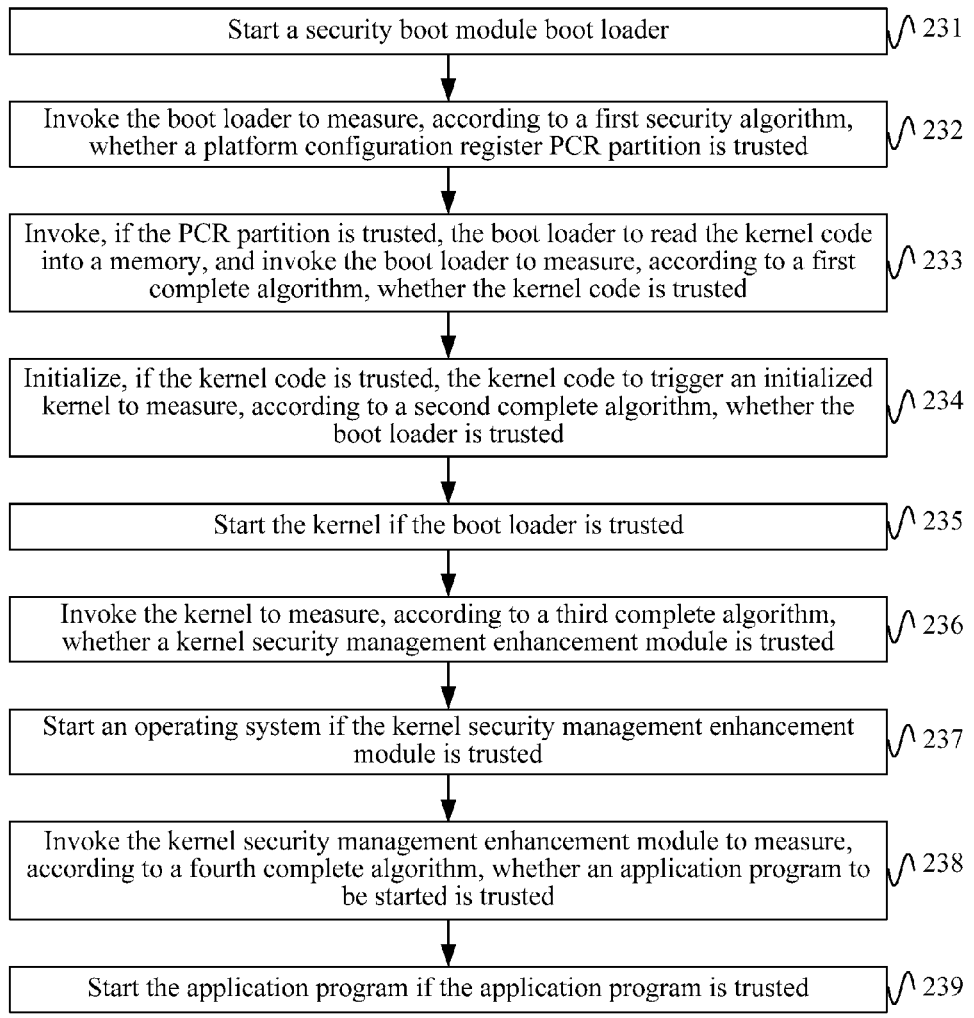
FIG. 2d is a flowchart of still another trusted kernel starting method according to an embodiment of the present invention.

Further, as shown in FIG. 2d, after step 227, that is, after the operating system completes normal starting, and before the operating system starts each application program, the operating system may further perform the following steps (S238 and S239) to further ensure security of the operating system. As shown in FIG. 2d, for content of steps 231 to 237, reference may be made to corresponding content of steps 221 to 227, and details are not described herein again.

S238: Invoke the kernel security management enhancement module to measure, according to a fourth complete algorithm, whether an application program to be started is trusted.

The fourth complete algorithm, like the first complete algorithm, is also prestored in a storage unit in the system, and a type of an algorithm that is specifically referenced by the fourth complete algorithm may be the same as a type of an algorithm that is referenced by the first complete algorithm, or the algorithm that is specifically referenced by the fourth complete algorithm is any one of the foregoing listed algorithms; and a specific measurement process of the fourth complete algorithm is also the same as the method and principle of measuring credibility of the kernel code by using the first complete algorithm, and details are not described herein again in this embodiment.

A specific measurement method is: the system first acquires, from the PCR partition, a standard measurement value of the application program to be started, where the standard measurement value is proactively reported to the system, when the corresponding application program is started for the first time, after the system invokes the kernel security management enhancement module to use an image file corresponding to the application program as a measured object and calculate, according to the fourth complete algorithm, a standard value corresponding to the application program, and is stored in the PCR partition by the system.

In addition, the system invokes the kernel security management enhancement module to calculate a current actual measurement value of the application program according to the fourth complete algorithm, and measures, by comparing whether the actual measurement value of the application program is equal to the standard measurement value, acquired from the PCR partition, of the application program, whether the application program is trusted, where if the actual measurement value of the application program is equal to the standard measurement value of the application program, it indicates that the application program is trusted.

S239: If the application program is trusted, the system starts the application program. On the contrary, if a actual measurement value of the application program is not equal to a standard measurement value of the application program, it indicates that the application program is untrusted; in this case, the kernel security management enhancement module proactively notifies the system that the current application program to be started is untrusted, and requests an instruction of whether to perform starting continuously. Then, the user determines whether to perform starting continuously in a manner of popping up a corresponding information window by the system.

It may be understood that step 236 and step 237 or steps 236 to 239 in this embodiment may also performed after step 218 in the embodiment shown in FIG. 2b, and details are not described herein again.

According to the trusted kernel starting method provided in embodiments of the present invention, a security boot module boot loader is started; the boot loader is invoked to measure, according to a first security algorithm, whether a PCR partition is trusted; if the PCR partition is trusted, the boot loader is invoked to read kernel code into a memory, and the boot loader is invoked to measure, according to a first complete algorithm and a kernel code standard measurement value prestored in the PCR partition, whether the kernel code is trusted; if the kernel code is trusted, the kernel code is initialized to trigger an initialized kernel to measure, according to a second complete algorithm, whether the boot loader is trusted; if the boot loader is trusted, the kernel is started; the kernel is invoked to measure, according to a third complete algorithm, whether a kernel security management enhancement module is trusted; and if the kernel security management enhancement module is trusted, an operating system is started. In this solution, kernel starting security and operating system starting security are improved to some extent.

Figure 3A:
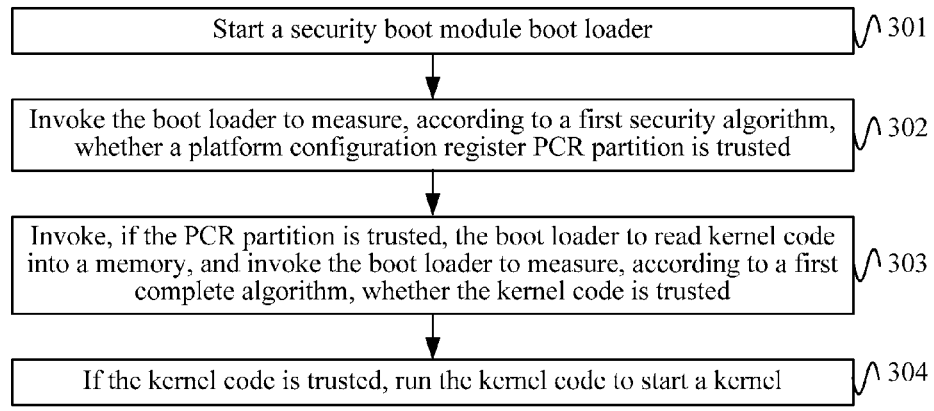
FIG. 3a is a flowchart of still another trusted kernel starting method according to an embodiment of the present invention.

FIG. 3a is a flowchart of another trusted kernel starting method according to an embodiment of the present invention. As shown in FIG. 3a, the trusted kernel starting method specifically includes:

S301: Start a security boot module boot loader. For a specific process of performing this step, reference may be made to corresponding content of step 201.

S302: Invoke the boot loader to measure, according to a first security algorithm, whether a PCR partition is trusted. For a specific process of performing this step, reference may be made to corresponding content of step 202.

S303: Invoke, if the PCR partition is trusted, the boot loader to read kernel code into a memory, and invoke the boot loader to measure, according to a first complete algorithm and a kernel code standard measurement value prestored in the PCR partition, whether the kernel code is trusted. For a specific process of performing this step, reference may be made to corresponding content of step 203.

S304: If the kernel code is trusted, run the kernel code to start a kernel.

Specifically, when the boot loader is invoked to measure, according to the first complete algorithm and the kernel code standard measurement value prestored in the PCR partition, that the kernel code is trusted, the system completely starts the kernel code and enables the OS to run in an SDRAM, so that the OS finally runs in the SDRAM. On the contrary, if the boot loader is invoked to measure, according to the first complete algorithm and the kernel code standard measurement value prestored in the PCR partition, that the kernel code is untrusted, the boot loader notifies the system that kernel security measurement fails, and reminds the system to stop the system starting process and power off the device.

In the trusted kernel starting method shown in this embodiment, compared with the embodiment shown in FIG. 2a, that the kernel measures the boot loader again in the starting process is removed, and the entire kernel is started directly, which simplifies a kernel procedure to some extent. Security when the kernel is started is also improved by measuring security of the PCR partition before the kernel is loaded.

Figure 3B:
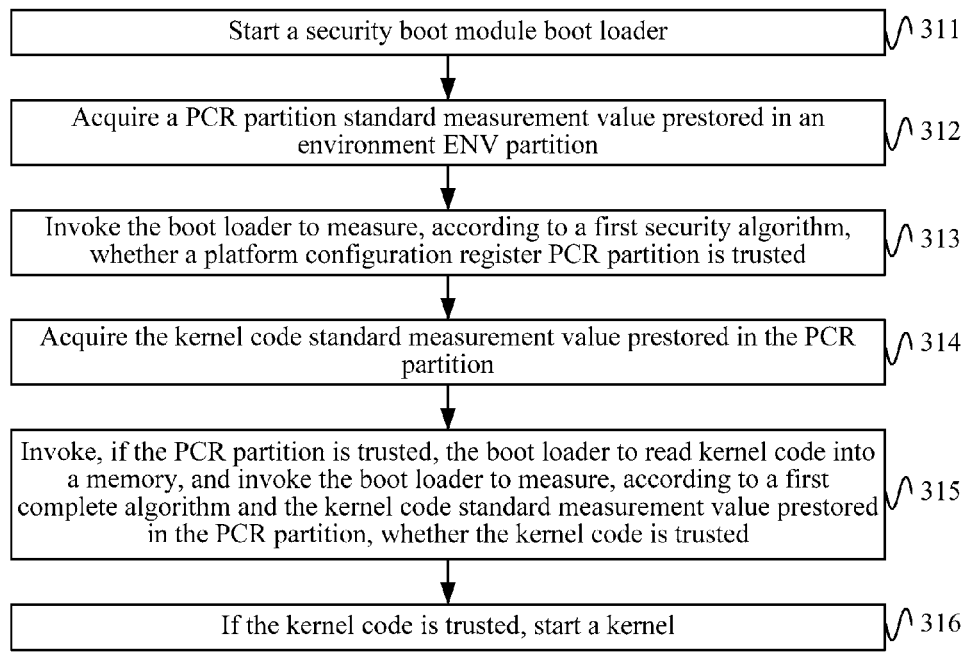
FIG. 3b is a flowchart of still another trusted kernel starting method according to an embodiment of the present invention.

FIG. 3b is a flowchart of another trusted kernel starting method according to an embodiment of the present invention. The trusted kernel starting method in this embodiment is a specific implementation manner of the embodiment shown in FIG. 3a. As shown in FIG. 3b, the trusted kernel starting method specifically includes:

S311: Start a security boot module boot loader.

S312: Acquire a standard measurement value, which is prestored in an environment ENV partition, of a PCR partition.

S313: Invoke the boot loader to measure, according to a first security algorithm, whether a PCR partition is trusted.

S314: Acquire a kernel code standard measurement value prestored in the PCR partition.

S315: Invoke, if the PCR partition is trusted, the boot loader to read the kernel code into a memory, and invoke the boot loader to measure, according to a first complete algorithm and the kernel code standard measurement value prestored in the PCR partition, whether the kernel code is trusted.

S316: If the kernel code is trusted, run the kernel code to start a kernel.

For a specific process of performing steps 311 to 315, reference may be made to corresponding content of steps 211 to 215, and for a specific process of performing step 316, reference may be made to corresponding content of step 304; details are not described herein again.

In the trusted kernel starting method shown in this embodiment, compared with the embodiment shown in FIG. 2b, that the kernel measures the boot loader again in the starting process is removed, and the entire kernel is started directly, which simplifies a kernel procedure to some extent. Security when the kernel is started is also improved by measuring security of the PCR partition before the kernel is loaded.

Figure 3C:
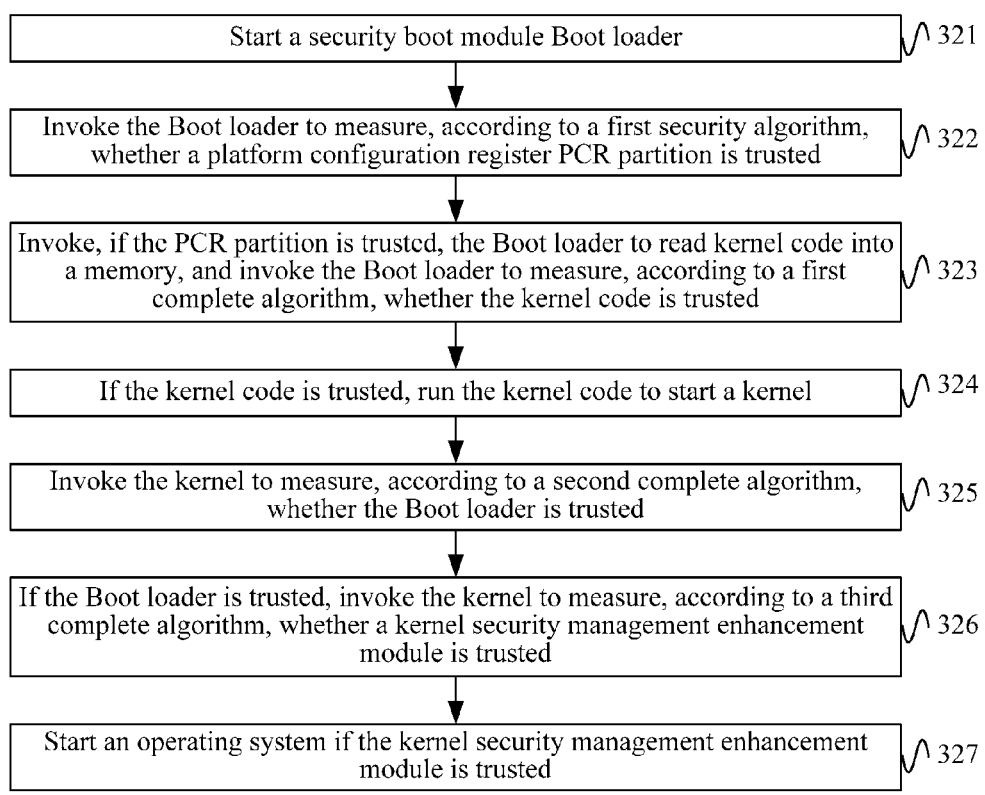
FIG. 3c is a flowchart of still another trusted kernel starting method according to an embodiment of the present invention.

FIG. 3c is a flowchart of still another trusted kernel starting method according to an embodiment of the present invention. The trusted kernel starting method in this embodiment is a specific implementation manner of the embodiment shown in FIG. 3a. As shown in FIG. 3c, based on the method shown in FIG. 3a, after step 304, the trusted kernel starting method further includes:

S325: Invoke the kernel to measure, according to a second complete algorithm, whether the boot loader is trusted.

S326: If the boot loader is trusted, invoke the kernel to measure, according to a third complete algorithm, whether a kernel security management enhancement module is trusted.

S327: Start an operating system if the kernel security management enhancement module is trusted.

As shown in FIG. 3c, for content of steps 321 to 324, reference may be made to corresponding content of steps 301 to 304, and details are not described herein again.

Figure 3D:
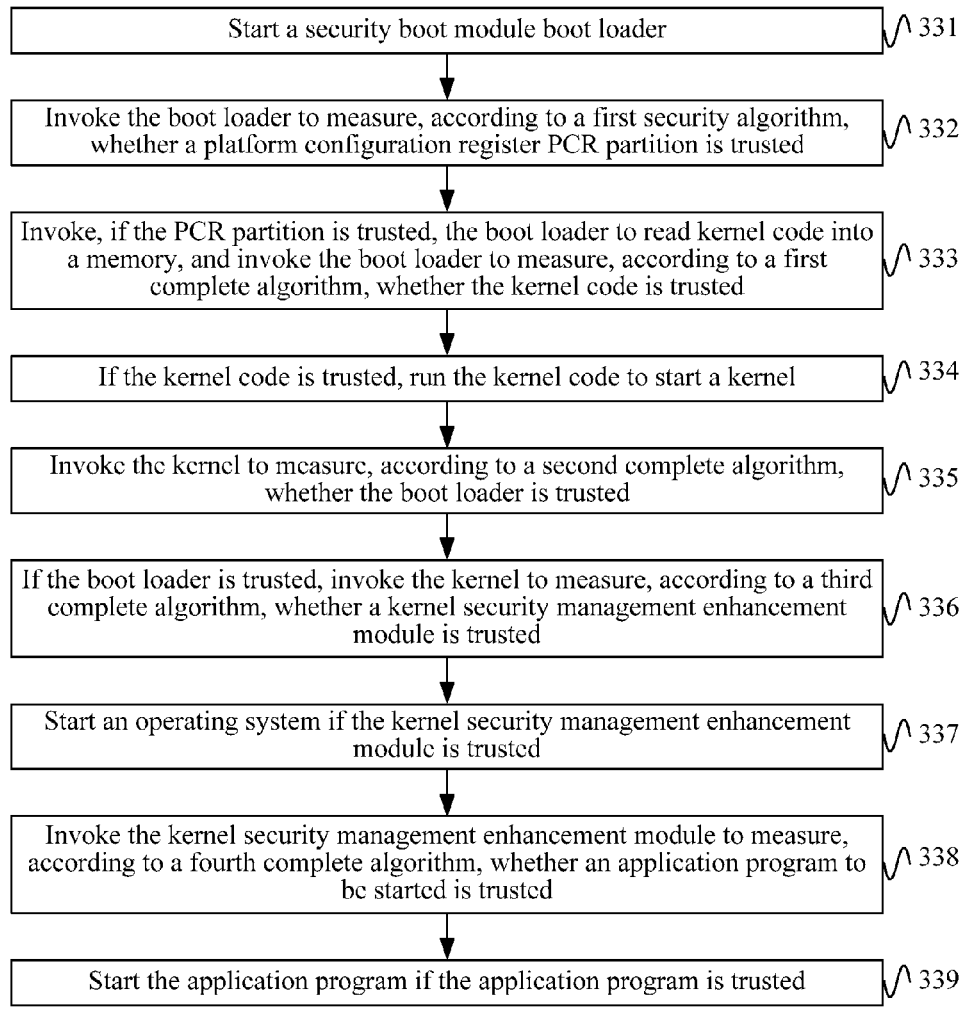
FIG. 3d is a flowchart of still another trusted kernel starting method according to an embodiment of the present invention.

Further, as shown in FIG. 3d, in this embodiment, after step 327, that is, after the operating system completes normal starting, and before the operating system starts each application program, the operating system may further perform the following steps (S338 and S339) to further ensure security of the operating system.

S338: Invoke the kernel security management enhancement module to measure, according to a fourth complete algorithm, whether an application program to be started is trusted.

S339: The system starts the application program if the application program is trusted.

For a specific process of performing step 338 and step 339, reference may be made to corresponding content of step 238 and step 239.

It may be understood that step 336 and step 337 or steps 336 to 339 in this embodiment may also be performed after step 316 in this embodiment shown in FIG. 3b, and details are not described herein again.

Further, before step 335, the method may further include: acquiring a standard measurement value, which is presorted in the PCR partition, of the boot loader. For a specific process of performing the step, reference may be made to corresponding content of step 216.

Further, for a specific process of performing step 335, reference may be made to corresponding content of step 217.

In the trusted kernel starting method shown in this embodiment, compared with the embodiment shown in FIG. 2c, that the kernel measures the boot loader again in the starting process is removed, and the entire kernel is started directly; then, the started kernel is invoked to perform secure measurement on the boot loader, which simplifies a kernel starting procedure to some extent, and ensures operating system starting security.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Figure 4A:
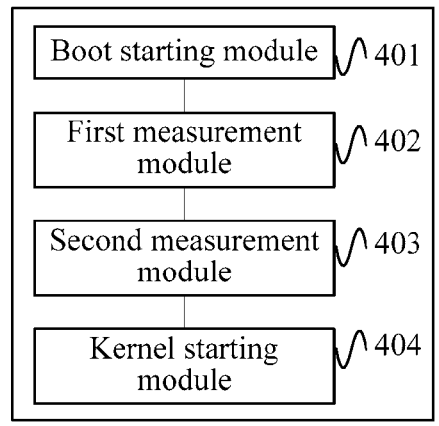
FIG. 4a is a schematic structural diagram of a trusted kernel starting apparatus according to an embodiment of the present invention.

FIG. 4a is a schematic structural diagram of a trusted kernel starting apparatus according to an embodiment of the present invention. The apparatus may be an embedded starting system or a fixed function module newly added to the system, for example, a trusted soft-component platform module shown in FIG. 1. The trusted kernel starting apparatus may perform the trusted kernel starting method shown in FIG. 2. As shown in FIG. 4, the trusted kernel starting apparatus specifically includes: a boot starting module 401, a first measurement module 402, a second measurement module 403, and a kernel starting module 404, where the boot starting module 401 is configured to start a security boot module boot loader;

the first measurement module 402 is configured to invoke the boot loader to measure, according to a first security algorithm, whether a PCR partition is trusted, where the first measurement module 402 is further configured to invoke, if the PCR partition is trusted, the boot loader to read kernel code into a memory, and invoke the boot loader to measure, according to a first complete algorithm and a kernel code standard measurement value prestored in the PCR partition, whether the kernel code is trusted;

the second measurement module 403 is configured to initialize, if the kernel code is trusted, the kernel code to trigger an initialized kernel to measure, according to a second complete algorithm, whether the boot loader is trusted; and the kernel starting module 404 is configured to start the kernel if the boot loader is trusted.

Figure 4B:
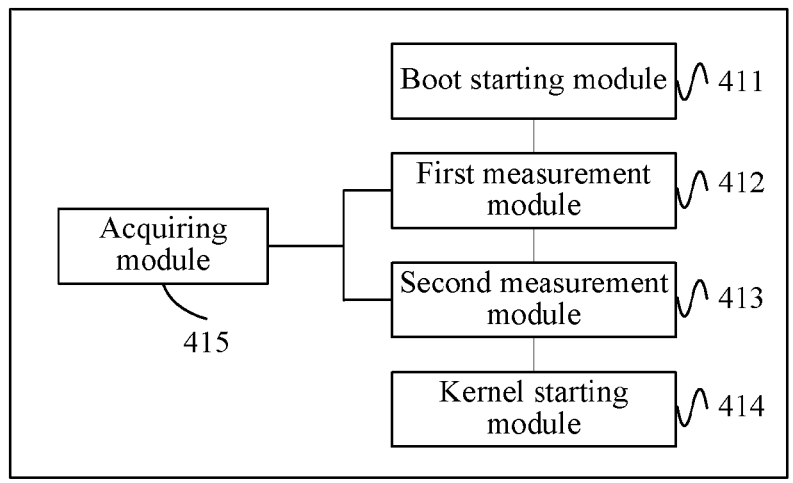
FIG. 4b is a schematic structural diagram of another trusted kernel starting apparatus according to an embodiment of the present invention.

Further, as shown in FIG. 4b, specific functions of 411 to 414 are correspondingly the same as functions of 401 to 404 in FIG. 4a, and details are not described herein again. The trusted kernel starting apparatus provided in this embodiment may further include an acquiring module 415, where the acquiring module 415 is configured to:

acquire a PCR partition standard measurement value prestored in an environment ENV partition; acquire the kernel code standard measurement value prestored in the PCR partition; and acquire a boot loader standard measurement value prestored in the PCR partition, where in the embodiment shown in FIG. 4b, the method steps of the embodiment shown in FIG. 2b may be performed by the trusted kernel starting apparatus shown in FIG. 4b.

Figure 4C:
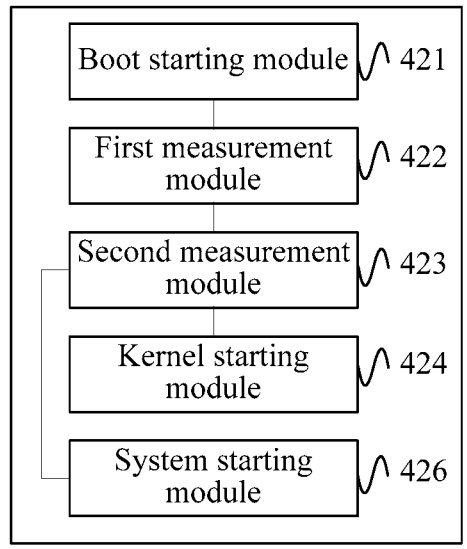
FIG. 4c is a schematic structural diagram of still another trusted kernel starting apparatus according to an embodiment of the present invention.

Further, as shown in FIG. 4c, specific functions of 421 to 424 are correspondingly the same as functions of 401 to 404 in FIG. 4a, and are not described herein again. In the trusted kernel starting apparatus provided in this embodiment:

a second measurement module 423 is further configured to invoke the kernel to measure, according to a third complete algorithm, whether a kernel security management enhancement module is trusted; and as shown in FIG. 4c, the trusted kernel starting apparatus may further include a system starting module 426, configured to start an operating system if the kernel security management enhancement module is trusted.

The method steps of the embodiment shown in FIG. 2c may be performed by the trusted kernel starting apparatus shown in FIG. 4c.

Figure 4D:
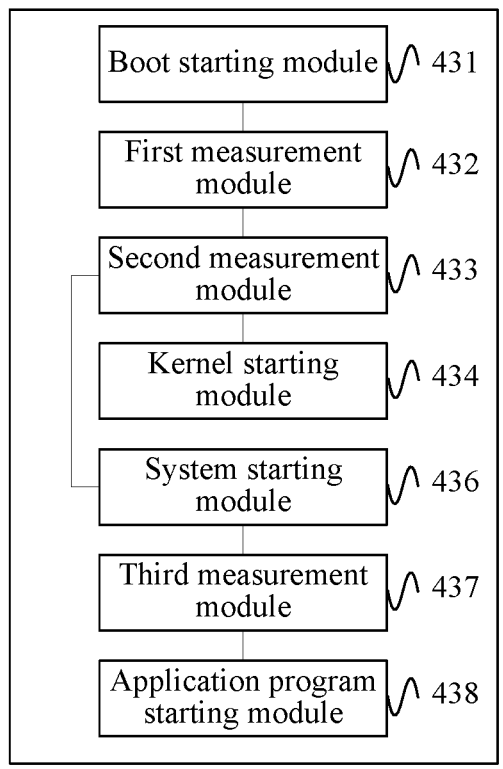
FIG. 4d is a schematic structural diagram of still another trusted kernel starting apparatus according to an embodiment of the present invention.

Further, as shown in FIG. 4d, specific functions of 431 to 434 and 436 are correspondingly the same as the functions of 421 to 424 and 426 in FIG. 4c, and details are not described herein again. The trusted kernel starting apparatus provided in this embodiment may further include:

a third measurement module 437, configured to invoke the kernel security management enhancement module to measure, according to a fourth complete algorithm, whether an application program to be started is trusted; and an application program starting module 438, configured to start the application program if the application program is trusted.

The method steps of the embodiment shown in FIG. 2d may be performed by the trusted kernel starting apparatus shown in FIG. 4d.

Figure 4E:
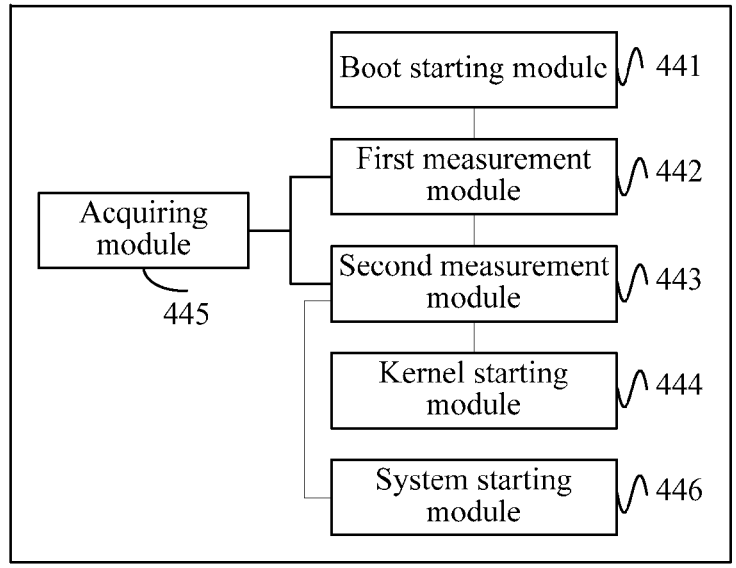
FIG. 4e is a schematic structural diagram of still another trusted kernel starting apparatus according to an embodiment of the present invention.

Further, as shown in FIG. 4e, specific functions of 441 to 445 are correspondingly the same as functions of 411 to 415 in FIG. 4b, and details are not described herein again. In the trusted kernel starting apparatus provided in this embodiment:

a second measurement module 443 is further configured to invoke the kernel to measure, according to a third complete algorithm, whether a kernel security management enhancement module is trusted; and an acquiring module 445 is further configured to acquire a kernel security management enhancement module standard measurement value prestored in the PCR partition; and as shown in FIG. 4e, the trusted kernel starting apparatus may further include a system starting module 446, configured to start an operating system if the kernel security management enhancement module is trusted.

Figure 4F:
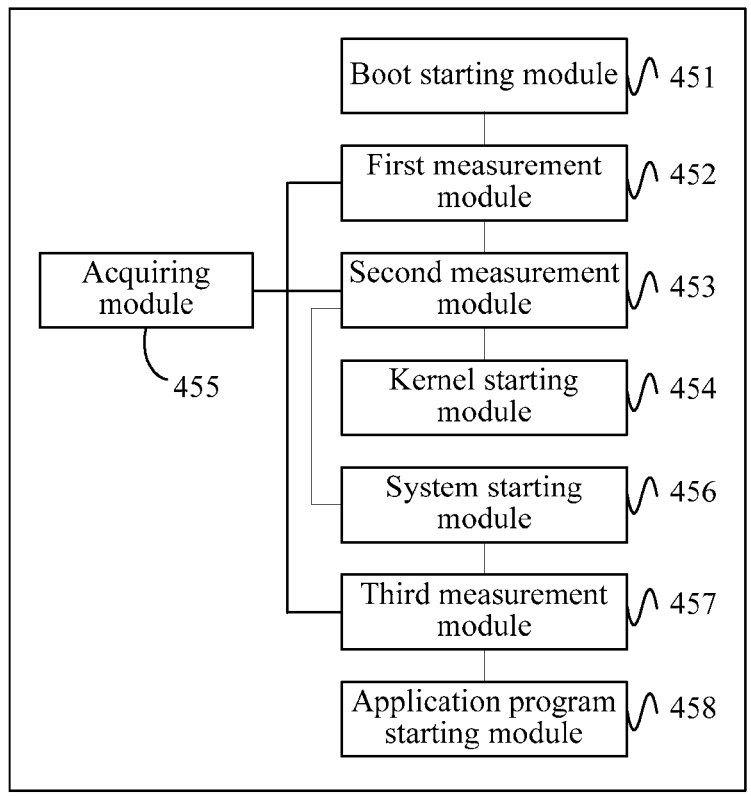
FIG. 4f is a schematic structural diagram of still another trusted kernel starting apparatus according to an embodiment of the present invention.

Further, as shown in FIG. 4f, specific functions of 451 to 456 are correspondingly the same as functions of 441 to 446 in FIG. 4e, and details are not described herein again. In the trusted kernel starting apparatus provided in this embodiment:

an acquiring module 455 is further configured to acquire a standard measurement value, which is prestored in the PCR partition, of the application program.

As shown in FIG. 4f, the trusted kernel starting apparatus may further include:

a third measurement module 457, configured to invoke the kernel security management enhancement module to measure, according to a fourth complete algorithm, whether an application program to be started is trusted; and an application program starting module 458, configured to start the application program if the application program is trusted.

The method steps of the embodiments shown in FIGS. 2a to 2d may be performed by the trusted kernel starting apparatus shown in FIG. 4f.

The trusted kernel starting apparatus provided in this embodiment of the present invention starts a security boot module boot loader; invokes the boot loader to measure, according to a first security algorithm, whether a PCR partition is trusted; if the PCR partition is trusted, invokes the boot loader to read kernel code into a memory, and invokes the boot loader to measure, according to a first complete algorithm and a kernel code standard measurement value prestored in the PCR partition, whether the kernel code is trusted; if the kernel code is trusted, initialize the kernel code to trigger an initialized kernel to measure, according to a second complete algorithm, whether the boot loader is trusted; and if the boot loader is trusted, starts a kernel. In this solution, kernel starting security is improved to some extent.

Figure 5A:
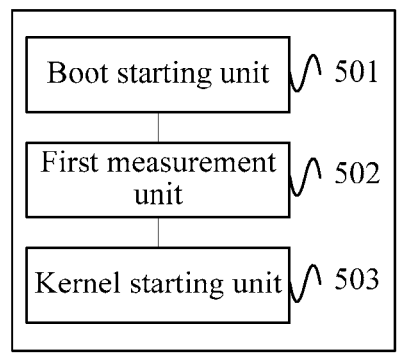
FIG. 5a is a schematic structural diagram of still another trusted kernel starting apparatus according to an embodiment of the present invention.

FIG. 5a is a schematic structural diagram of still another trusted kernel starting apparatus according to an embodiment of the present invention. The apparatus may be the embedded starting system or a fixed function module newly added to the system, for example, a trusted soft-component platform module shown in FIG. 1. The trusted kernel starting apparatus may perform the trusted kernel starting method shown in FIG. 3a. As shown in FIG. 5a, the trusted kernel starting apparatus specifically includes: a boot starting unit 501, a first measurement unit 502, and a kernel starting unit 503, where the boot starting unit 501 is configured to start a security boot module boot loader;

the first measurement module 502 is configured to invoke the boot loader to measure, according to a first security algorithm, whether a PCR partition is trusted, where the first measurement module 502 is further configured to invoke, if the PCR partition is trusted, the boot loader to read kernel code into a memory, and invoke the boot loader to measure, according to a first complete algorithm and a kernel code standard measurement value prestored in the PCR partition, whether the kernel code is trusted; and the kernel starting unit 503 is configured to: if the kernel code is trusted, run the kernel code to start a kernel.

Figure 5B:
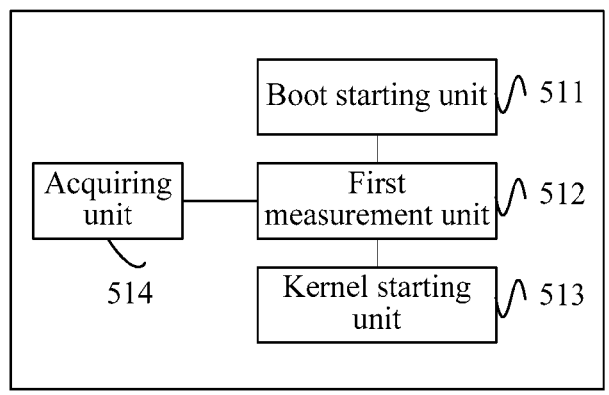
FIG. 5b is a schematic structural diagram of still another trusted kernel starting apparatus according to an embodiment of the present invention.

Further, as shown in FIG. 5b, specific functions of 511 to 513 are correspondingly the same as functions of 501 to 503 in FIG. 5a, and details are not described herein again. The trusted kernel starting apparatus provided in this embodiment may further include an acquiring unit 514, where the acquiring unit 514 is configured to:

acquire a PCR partition standard measurement value prestored in an environment ENV partition; and acquire the kernel code standard measurement value prestored in the PCR partition.

The method steps of the embodiment shown in FIG. 3b may be performed by the trusted kernel starting apparatus shown in FIG. 5b.

Figure 5C:
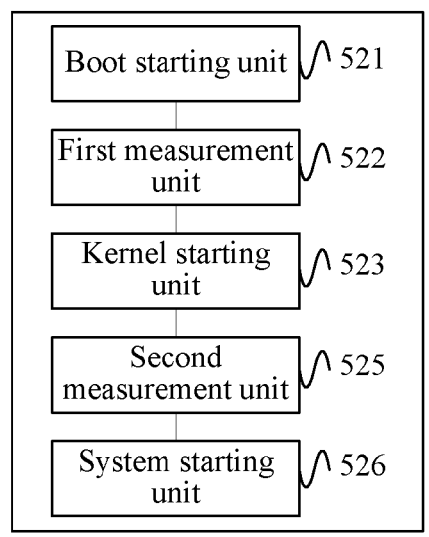
FIG. 5c is a schematic structural diagram of still another trusted kernel starting apparatus according to an embodiment of the present invention.

Further, as shown in FIG. 5c, specific functions of 521 to 523 are correspondingly the same as functions of 501 to 503 in FIG. 5a, and details are not described herein again. The trusted kernel starting apparatus provided in this embodiment may further include:

a second measurement unit 525, configured to invoke the kernel to measure, according to a second complete algorithm, whether the boot loader is trusted, where the second measurement unit 525 is further configured to: if the boot loader is trusted, invoke the kernel to measure, according to a third complete algorithm, whether a kernel security management enhancement module is trusted; and a system starting unit 526, configured to start an operating system if the kernel security management enhancement module is trusted.

The method steps of the embodiment shown in FIG. 3c may be performed by the trusted kernel starting apparatus shown in FIG. 5c.

Figure 5D:
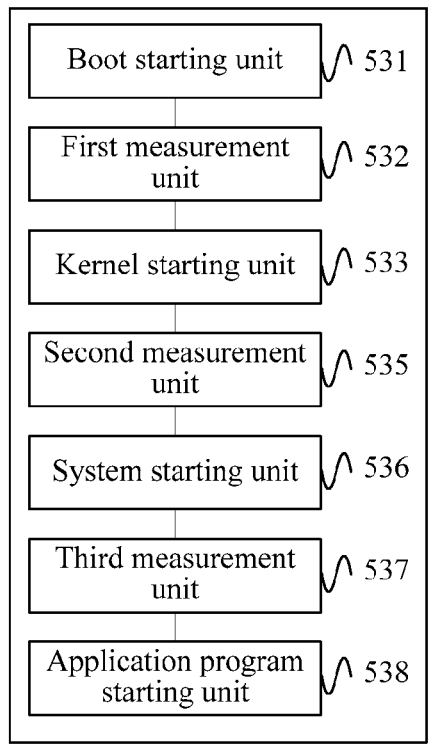
FIG. 5d is a schematic structural diagram of still another trusted kernel starting apparatus according to an embodiment of the present invention.

Further, as shown in FIG. 5d, specific functions of 531 to 533, 535 and 536 are correspondingly the same as the functions of 521 to 523, 525 and 526 in FIG. 5c, and details are not described herein again. The trusted kernel starting apparatus provided in this embodiment may further include:

a third measurement unit 537, configured to invoke the kernel security management enhancement module to measure, according to a fourth complete algorithm, whether an application program to be started is trusted; and an application program starting unit 538, configured to start the application program if the application program is trusted.

The method steps of the embodiment shown in FIG. 3d may be performed by the trusted kernel starting apparatus shown in FIG. 5d.

Figure 5E:
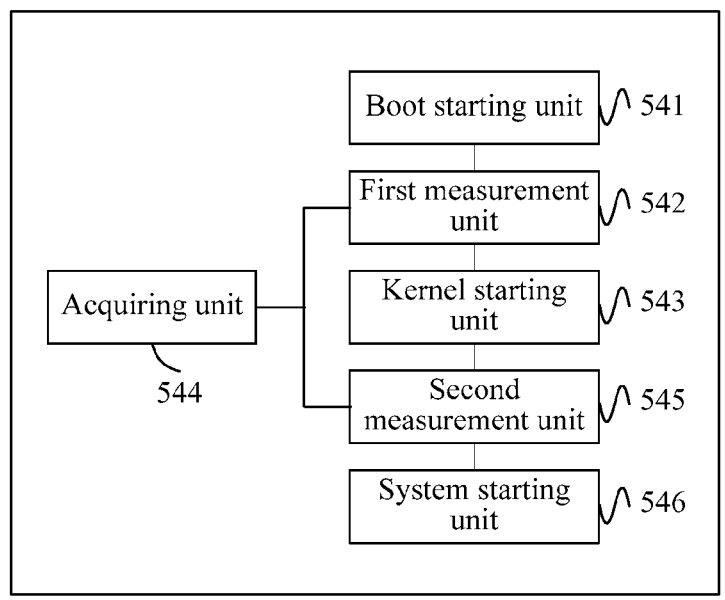
FIG. 5e is a schematic structural diagram of still another trusted kernel starting apparatus according to an embodiment of the present invention.

Further, as shown in FIG. 5e, specific functions of 541 to 544 are correspondingly the same as functions of 511 to 514 in FIG. 5b, and details are not described herein again. The trusted kernel starting apparatus provided in this embodiment may further include:

a second measurement unit 545, configured to invoke the kernel to measure, according to a second complete algorithm, whether the boot loader is trusted, where the second measurement unit 545 is further configured to: if the boot loader is trusted, invoke the kernel to measure, according to a third complete algorithm, whether a kernel security management enhancement module is trusted; and a system starting unit 546, configured to start an operating system if the kernel security management enhancement module is trusted.

In the trusted kernel starting apparatus shown in FIG. 5e, an acquiring unit 544 is further configured to: acquire a boot loader standard measurement value prestored in the PCR partition; and acquire a kernel security management enhancement module standard measurement value prestored in the PCR partition.

Figure 5F:
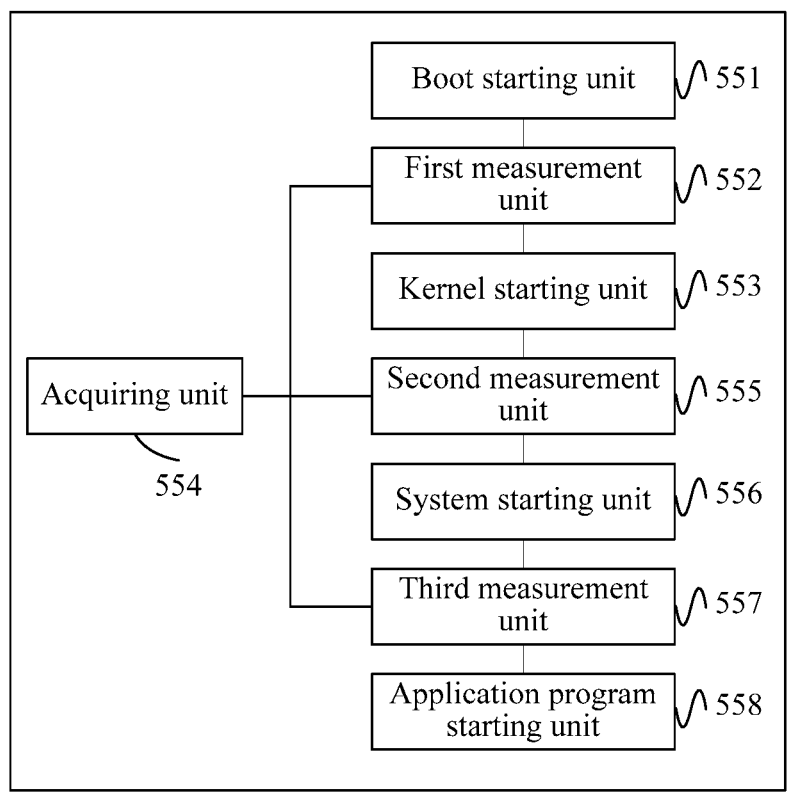
FIG. 5f is a schematic structural diagram of still another trusted kernel starting apparatus according to an embodiment of the present invention.

Further, as shown in FIG. 5f, specific functions of 551 to 556 are correspondingly the same as functions of 541 to 546 in FIG. 5e, and details are not described herein again. In the trusted kernel starting apparatus provided in this embodiment:

an acquiring unit 554 is further configured to acquire a standard measurement value, which is prestored in the PCR partition, of the application program.

As shown in FIG. 5f, the trusted kernel starting apparatus may further include:

a third measurement module 557, configured to invoke the kernel security management enhancement module to measure, according to a fourth complete algorithm, whether an application program to be started is trusted; and an application program starting module 558, configured to start the application program if the application program is trusted.

The method steps of the embodiments shown in FIGS. 3a to 3d may be performed by the trusted kernel starting apparatus shown in FIG. 5f.

The trusted kernel starting apparatus shown in this embodiment starts a security boot module boot loader; invokes the boot loader to measure, according to a first security algorithm, whether a PCR partition is trusted; if the PCR partition is trusted, invokes the boot loader to read kernel code into a memory, and invokes the boot loader to measure, according to a first complete algorithm and a kernel code standard measurement value prestored in the PCR partition, whether the kernel code is trusted; if the kernel code is trusted, runs the kernel code to start a kernel. Compared with the embodiment shown in FIG. 4a, that the kernel measures the boot loader again in the starting process is removed, and the entire kernel is started directly, which simplifies a kernel starting procedure to some extent. Security when the kernel is started is also improved by measuring security of the PCR partition before the kernel is loaded.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A trusted kernel starting method, comprising:
   starting a security boot loader;
   invoking the boot loader to measure, according to a first security algorithm, whether a platform configuration register (PCR) partition is trusted;
   invoking, if the PCR partition is trusted, the boot loader to read kernel code into a memory, and invoking the boot loader to measure, according to a first complete algorithm and a kernel code standard measurement value prestored in the PCR partition, whether the kernel code is trusted;

initializing, if the kernel code is trusted, the kernel code to trigger an initialized kernel to measure, according to a second complete algorithm, whether the boot loader is trusted; and starting the kernel if the boot loader is trusted.

2. The trusted kernel starting method according to claim 1, further comprising:

acquiring a PCR partition standard measurement value prestored in an environment (ENV) partition; and wherein the invoking the boot loader to measure, according to the first security algorithm, whether the PCR partition is trusted comprises:

invoking the boot loader to calculate a PCR partition actual measurement value according to the first security algorithm, and measuring, by comparing whether the PCR partition actual measurement value is equal to the PCR partition standard measurement value, whether the PCR partition is trusted, wherein if the PCR partition actual measurement value is equal to the PCR partition standard measurement value, the PCR partition is trusted.

3. The trusted kernel starting method according to claim 2, wherein the acquiring a PCR partition standard measurement value prestored in an ENV partition comprises:

generating a root key based on a PIN entered by a user; and decrypting the ENV partition by using the root key, to acquire the PCR partition standard measurement value prestored in the ENV partition.

4. The trusted kernel starting method according to claim 1, further comprising:

acquiring the kernel code standard measurement value prestored in the PCR partition; and wherein the invoking, if the PCR partition is trusted, the boot loader to read kernel code into a memory, and invoking the boot loader to measure, according to a first complete algorithm and a kernel code standard measurement value prestored in the PCR partition, whether the kernel code is trusted comprises:

if the PCR partition is trusted, invoking the boot loader to read the kernel code into the memory, invoking the boot loader to calculate a kernel code actual measurement value according to the first complete algorithm, and measuring whether the kernel code is trusted by comparing whether the kernel code actual measurement value is equal to the kernel code standard measurement value, wherein the kernel code is trusted if the kernel code actual measurement value is equal to the kernel code standard measurement value.

5. The trusted kernel starting method according to claim 1, further comprising:

acquiring a boot loader standard measurement value prestored in the PCR partition; and wherein the initializing, if the kernel code is trusted, the kernel code to trigger an initialized kernel to measure, according to a second complete algorithm, whether the boot loader is trusted comprises:

if the kernel code is trusted, initializing the kernel code to trigger the initialized kernel to calculate a boot loader actual measurement value according to the second complete algorithm, and measuring whether the boot loader is trusted by comparing whether the boot loader actual measurement value is equal to the boot loader standard measurement value, wherein the boot loader is trusted if the boot loader actual measurement value is equal to the boot loader standard measurement value.

6. The trusted kernel starting method according to claim 1, further comprising:

invoking the kernel to measure, according to a third complete algorithm, whether a kernel security management enhancement software module is trusted; and starting an operating system if the kernel security management enhancement software module is trusted.

7. The trusted kernel starting method according to claim 6, further comprising:

acquiring a kernel security management enhancement software module standard measurement value prestored in the PCR partition; and wherein the invoking the kernel to measure, according to a third complete algorithm, whether a kernel security management enhancement software module is trusted comprises:

invoking the kernel to calculate a kernel security management enhancement software module actual measurement value according to the third complete algorithm, and measuring whether the kernel security management enhancement software module is trusted by comparing whether the kernel security management enhancement software module actual measurement value is equal to the kernel security management enhancement software module standard measurement value, wherein if the kernel security management enhancement software module actual measurement value is equal to the kernel security management enhancement software module standard measurement value, the kernel security management enhancement software module is trusted.

8. The trusted kernel starting method according to claim 6, after the starting an operating system, further comprising:

invoking the kernel security management enhancement software module to measure, according to a fourth complete algorithm, whether an application program to be started is trusted; and starting the application program if the application program is trusted.

9. The trusted kernel starting method according to claim 8, further comprising:

acquiring a standard measurement value, which is prestored in the PCR partition, of the application program; and wherein the invoking the kernel security management enhancement software module to measure, according to a fourth complete algorithm, whether an application program to be started is trusted comprises:

invoking the kernel security management enhancement software module to calculate a actual measurement value of the application program according to the fourth complete algorithm, and measuring whether the application program is trusted by comparing whether the actual measurement value of the application program is equal to the standard measurement value of the application program, wherein if the actual measurement value of the application program is equal to the standard measurement value of the application program, the application program is trusted.

10. A trusted kernel starting method, comprising:

starting a security boot loader;

invoking the boot loader to measure, according to a first security algorithm, whether a platform configuration register (PCR) partition is trusted;

invoking, if the PCR partition is trusted, the boot loader to read kernel code into a memory, and invoking the boot loader to measure, according to a first complete algorithm and a kernel code standard measurement value prestored in the PCR partition, whether the kernel code is trusted; and if the kernel code is trusted, running the kernel code to start a kernel.

11. The trusted kernel starting method according to claim 10, after the running the kernel code to start the kernel, further comprising:

invoking the kernel to measure, according to a second complete algorithm, whether the boot loader is trusted;

if the boot loader is trusted, invoking the kernel to measure, according to a third complete algorithm, whether a kernel security management enhancement software module is trusted; and starting an operating system if the kernel security management enhancement software module is trusted.

12. The trusted kernel starting method according to claim 11, further comprising:

acquiring a boot loader standard measurement value prestored in the PCR partition; and wherein the invoking the kernel to measure, according to a second complete algorithm, whether the boot loader is trusted comprises:

invoking the kernel to calculate a boot loader actual measurement value according to the second complete algorithm, and measuring whether the boot loader is trusted by comparing whether the boot loader actual measurement value is equal to the boot loader standard measurement value, wherein if the boot loader actual measurement value is equal to the boot loader standard measurement value, the boot loader is trusted.

13. A trusted kernel starting apparatus, comprising a processor and a non-transitory computer readable medium with stored instructions, such that when the instructions are executed by the processor, the processor is caused to:

start a security boot loader;

invoke the boot loader to measure, according to a first security algorithm, whether a platform configuration register (PCR) partition is trusted;

invoke, if the PCR partition is trusted, the boot loader to read kernel code into a memory, and invoke the boot loader to measure, according to a first complete algorithm and a kernel code standard measurement value prestored in the PCR partition, whether the kernel code is trusted;

initialize, if the kernel code is trusted, the kernel code to trigger an initialized kernel to measure, according to a second complete algorithm, whether the boot loader is trusted; and start the kernel if the boot loader is trusted.

14. The trusted kernel starting apparatus according to claim 13, wherein the processor is further caused to:

acquire a PCR partition standard measurement value prestored in an environment (ENV) partition;

invoke the boot loader to calculate a PCR partition actual measurement value according to the first security algorithm, and measure whether the PCR partition is trusted by comparing whether the PCR partition actual measurement value is equal to the PCR partition standard measurement value, wherein the PCR partition is trusted if the PCR partition actual measurement value is equal to the PCR partition standard measurement value.

15. The trusted kernel starting apparatus according to claim 14, wherein the processor is further caused to:

generate a root key based on a PIN entered by a user, and decrypt the ENV partition by using the root key, to acquire the standard measurement value, which is prestored in the ENV partition, of the PCR partition.

16. The trusted kernel starting apparatus according to claim 13, wherein the processor is further caused to:

acquire the kernel code standard measurement value prestored in the PCR partition; and if the PCR partition is trusted, invoke the boot loader to read the kernel code into the memory, invoke the boot loader to calculate a kernel code actual measurement value according to the first complete algorithm, and measure whether the kernel code is trusted by comparing whether the kernel code actual measurement value is equal to the kernel code standard measurement value, wherein if the kernel code actual measurement value is equal to the kernel code standard measurement value, the kernel code is trusted.

17. The trusted kernel starting apparatus according to claim 13, wherein the processor is further caused to:

acquire a boot loader standard measurement value prestored in the PCR partition; and if the kernel code is trusted, initialize the kernel code to trigger the initialized kernel to calculate a boot loader actual measurement value according to the second complete algorithm, and measure whether the boot loader is trusted by comparing whether the boot loader actual measurement value is equal to the boot loader standard measurement value, wherein if the boot loader actual measurement value is equal to the boot loader standard measurement value, the boot loader is trusted.

18. The trusted kernel starting apparatus according to claim 17, wherein the processor is further caused to:

invoke the kernel to measure, according to a third complete algorithm, whether a kernel security management enhancement software module is trusted; and start an operating system if the kernel security management enhancement software module is trusted.

19. The trusted kernel starting apparatus according to claim 18, wherein the processor is further caused to:

acquire a kernel security management enhancement software module standard measurement value prestored in the PCR partition; and invoke the kernel to calculate a kernel security management enhancement software module actual measurement value according to the third complete algorithm, and measure whether the kernel security management enhancement software module is trusted by comparing whether the kernel security management enhancement software module actual measurement value is equal to the kernel security management enhancement software module standard measurement value, wherein if the kernel security management enhancement software module actual measurement value is equal to the kernel security management enhancement software module standard measurement value, the kernel security management enhancement software module is trusted.

20. The trusted kernel starting apparatus according to claim 18, wherein the processor is further caused to:

invoke the kernel security management enhancement software module to measure, according to a fourth complete algorithm, whether an application program to be started is trusted; and start the application program if the application program is trusted.

21. The trusted kernel starting apparatus according to claim 20, wherein the processor is further caused to:
acquire a standard measurement value, which is prestored in the PCR partition, of the application program; and
invoke the kernel security management enhancement software module to calculate a actual measurement value of the application program according to the fourth complete algorithm, and measure whether the application program is trusted by comparing whether the actual measurement value of the application program is equal to the standard measurement value of the application program, wherein if the actual measurement value of the application program is equal to the standard measurement value of the application program, the application program is trusted.

22. A trusted kernel starting apparatus, comprising a processor and a non-transitory computer readable medium with stored instructions, such that when the instructions are executed by the processor, the processor is caused to:
start a security boot loader;
invoke the boot loader to measure, according to a first security algorithm, whether a platform configuration register (PCR) partition is trusted;
invoke, if the PCR partition is trusted, the boot loader to read kernel code into a memory, and invoke the boot loader to measure, according to a first complete algorithm and a kernel code standard measurement value prestored in the PCR partition, whether the kernel code is trusted; and
if the kernel code is trusted, run the kernel code to start a kernel.

23. The trusted kernel starting apparatus according to claim 22, wherein the processor is further caused to:
invoke the kernel to measure, according to a second complete algorithm, whether the boot loader is trusted;
if the boot loader is trusted, invoke the kernel to measure, according to a third complete algorithm, whether a kernel security management enhancement software module is trusted; and
start an operating system if the kernel security management enhancement software module is trusted.

24. The trusted kernel starting apparatus according to claim 23, wherein the processor is further caused to:
acquire a boot loader standard measurement value prestored in the PCR partition; and
invoke the kernel to calculate a boot loader actual measurement value according to the second complete algorithm, and measure whether the boot loader is trusted by comparing whether the boot loader actual measurement value is equal to the boot loader standard measurement value, wherein if the boot loader actual measurement value is equal to the boot loader standard measurement value, the boot loader is trusted.

* * * * *